(12) United States Patent
Kondo et al.

(10) Patent No.: US 6,738,492 B1
(45) Date of Patent: May 18, 2004

(54) CODING APPARATUS AND METHOD, DECODING APPARATUS AND METHOD, DATA PROCESSING SYSTEM, STORAGE MEDIUM, AND SIGNAL

(75) Inventors: Tetsujiro Kondo, Tokyo (JP); Kenji Tanaka, Chiba (JP); Yoshinori Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/413,983

(22) Filed: Oct. 7, 1999

(30) Foreign Application Priority Data

| Oct. 7, 1998 | (JP) | .......................... 10-285309 |
| May 11, 1999 | (JP) | .......................... 11-129919 |
| Oct. 5, 1999 | (JP) | .......................... 11-284199 |

(51) Int. Cl.[7] ................................ G06K 9/00
(52) U.S. Cl. ..................... 382/100; 382/168
(58) Field of Search ............... 382/100, 168

(56) References Cited

U.S. PATENT DOCUMENTS

5,727,092 A * 3/1998 Sandford et al. ........... 382/251
5,778,102 A * 7/1998 Sandford et al. ........... 382/251

FOREIGN PATENT DOCUMENTS

| EP | 0 845 757 | 6/1998 |
| EP | 0 859 337 | 8/1998 |

OTHER PUBLICATIONS

Swanson M D et al: "Multiresolution Scene–Based Video Watermarking Using Perceptual Models" IEEE Journal on Selected Areas in Communications, IEEE Inc. New York, US, vol. 16, No. 4, May 1, 1998, pp. 540–550, XP000765114 ISSN: 0733–8716.

Swanson M D et al: "Multiresolution Video Watermarking Using Perceptual Models and Scene Segmentation" Proceedings of the International Conference on Image Processing., US, Los Alamitos, CA: IEEE Computer Society, Oct. 1997, pp. 558–561, XP000669444 ISBN: 0–8186–8184–5.

Swanson M D et al: "Robust audio watermarking using perceptual masking" Signal Processing. European Journal Devoted to the Methods and Applications of Signal Processing, Elsevier Science Publishers B.V. Amsterdam, NL, vol. 66, No. 3, May 28, 1998, pp. 337–355, XP004124956 ISSN: 0165–1684.

Boney L., Tewfik A., Hamdy K.: "Digital Watermarks for Audio Signals" Multimedia Computing and Systems, 1996, Proceedings of the Third IEEE International Conference, Jun. 17–23, 1996, pp. 473–480, XP002160496.

* cited by examiner

*Primary Examiner*—Leo Boudreau
*Assistant Examiner*—Tom Y. Lu
(74) *Attorney, Agent, or Firm*—Frommer Lawrence & Haug LLP; William S. Frommer; Bruno Polito

(57) ABSTRACT

The invention relates to a coding apparatus for embedding second data into first data without deteriorating the first data and a decoding apparatus for decoding coded data into original first data and second data without deteriorating those data. The invention provides a coding apparatus which determines change subject data and change data based on a frequency distribution of at least partial data of the first data, and embeds second data into first data by causing a change from the change subject data to the change data according to the second data. The invention also provides a decoding apparatus which determines change subject data and change data based on a frequency distribution of at least partial data of coded data in which second data is embedded, and decodes the coded data into original first data and restores the second data that is embedded in the coded data by restoring the change subject data from the change data.

43 Claims, 27 Drawing Sheets

IMAGE TRANSMISSION SYSTEM

EMBEDDED CODING/DECODING

UTILIZATION OF CONTINUITY

UTILIZATION OF SIMILARITY

• CHANGE SUBJECT PIXEL VALUE
× CHANGE VALUE

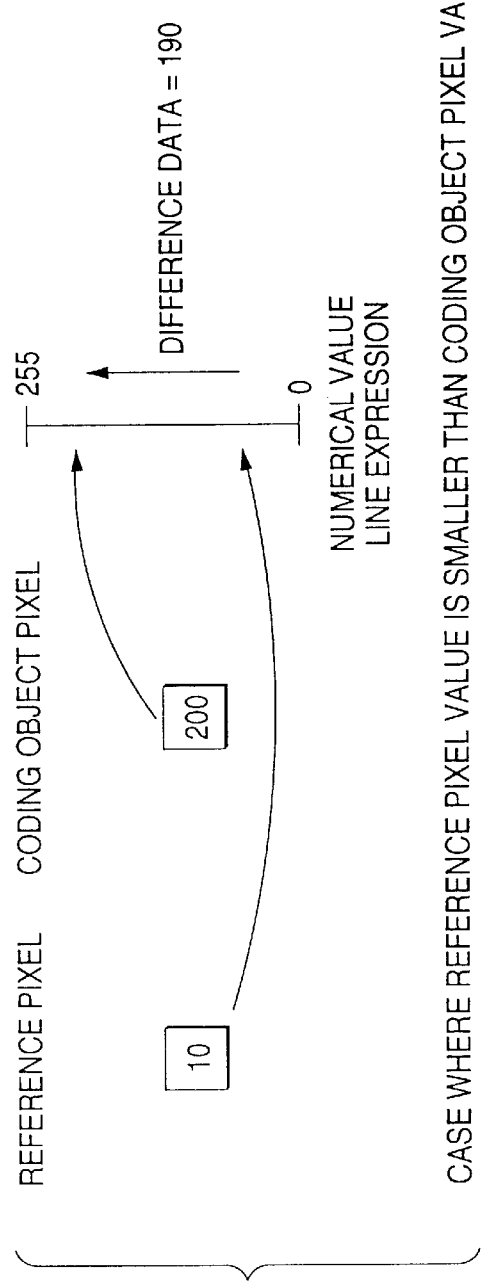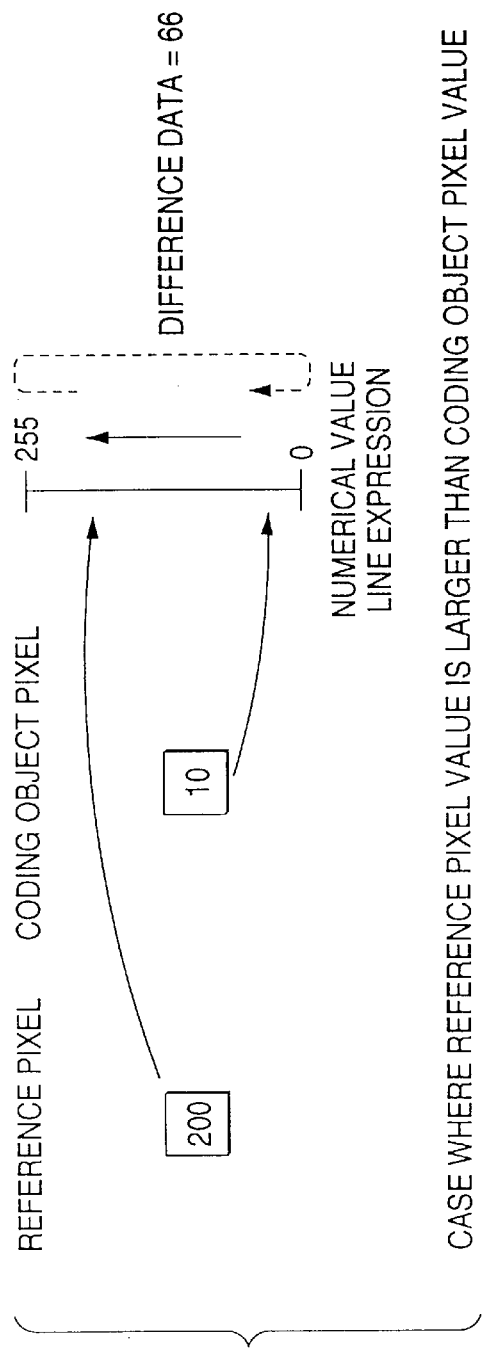

HISTOGRAM OF IMAGE a

HISTOGRAM OF DIFFERENCE DATA OF IMAGE a

HISTOGRAM OF IMAGE b

HISTOGRAM OF DIFFERENCE DATA OF IMAGE b

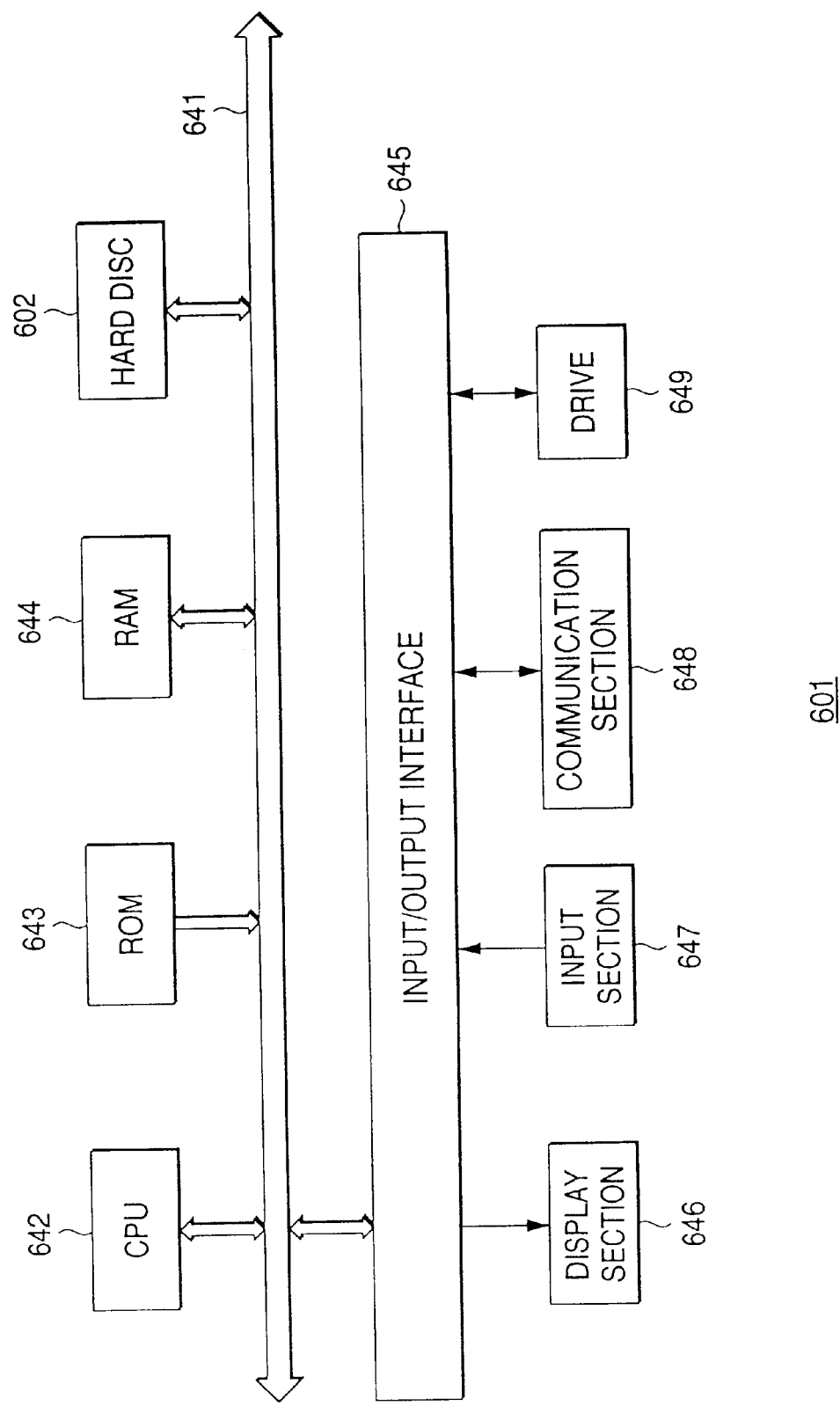

CODING APPARATUS AND METHOD, DECODING APPARATUS AND METHOD, DATA PROCESSING SYSTEM, STORAGE MEDIUM, AND SIGNAL

BACKGROUND

1. Field of the Invention

The present invention relates to a coding apparatus and method, a decoding apparatus and method, a data processing system, a storage medium, and a signal. In particular, the invention relates to a coding apparatus and method, a decoding apparatus and method, a data processing system, a storage medium, and a signal which allow information to be embedded into data without deterioration in decoded data and without increase in data amount.

2. Background of the Invention

An example of a technique of embedding information without increasing the data amount is such that the LSB or the lowest two bits of digital audio data are converted to information to be embedded. In this technique, the fact that the lowest bit or bits of digital audio data do not much influence its sound quality is utilized and the lowest bit or bits of digital audio data are simply replaced by information to be embedded. Therefore, at the time of reproduction, information-embedded digital audio data is output as it is, that is, without returning the lowest bit or bits to the original state. That is, the digital audio data is output in a state that information is embedded therein because it is difficult to return the lowest bit or bits embedded information to the original state and the lowest bit or bits do not much influence the sound quality.

However, in the above technique, a signal that is different from the original signal is output. Therefore, influence occurs in the sound quality when the signal is audio data or in the image quality when the signal is video data.

SUMMARY OF THE INVENTION

An object of the present invention is to solve the above-described problem.

To attain the above object, the invention provides a coding apparatus for coding first data according to second data, comprising a memory for storing at least partial data of the first data; and a coding section for embedding data relating to the second data into the first data by rearranging, according to the second data, the at least partial data of the first data that is stored in the memory.

To attain the above object, the invention provides a decoding apparatus for decoding coded data that has been produced by coding first data according to second data, comprising a correlation calculating section for calculating a correlation between first partial data and second partial data of the coded data; and a decoding section for decoding the coded data into the original, first data by moving the first partial data and the second partial data of the coded data based on the correlation calculated by the correlation calculating section, and for restoring the second data that is embedded in the coded data according to the movement.

BRIEF DESCRIPTION OF THE DRAWINGS

FIG. 20A is a first chart illustrating an expression of the difference between a coding object pixel value and a reference pixel value;

FIG. 20B is a second chart illustrating an expression of the difference between a coding object pixel value and a reference pixel value;

FIG. 23A is a graph showing a frequency distribution of the pixel values of image a;

FIG. 23B is a graph showing a frequency distribution of difference data of image a;

FIG. 30 is a block diagram showing an example computer in which a program for causing execution of a process relating to the invention is to be installed.

DESCRIPTION OF THE PREFERRED EMBODIMENTS

A coding apparatus and method, a decoding apparatus and method, a digital processing system, a storage medium, and a signal according to the present invention will be hereinafter described with reference to the accompanying drawings.

Figure 1:
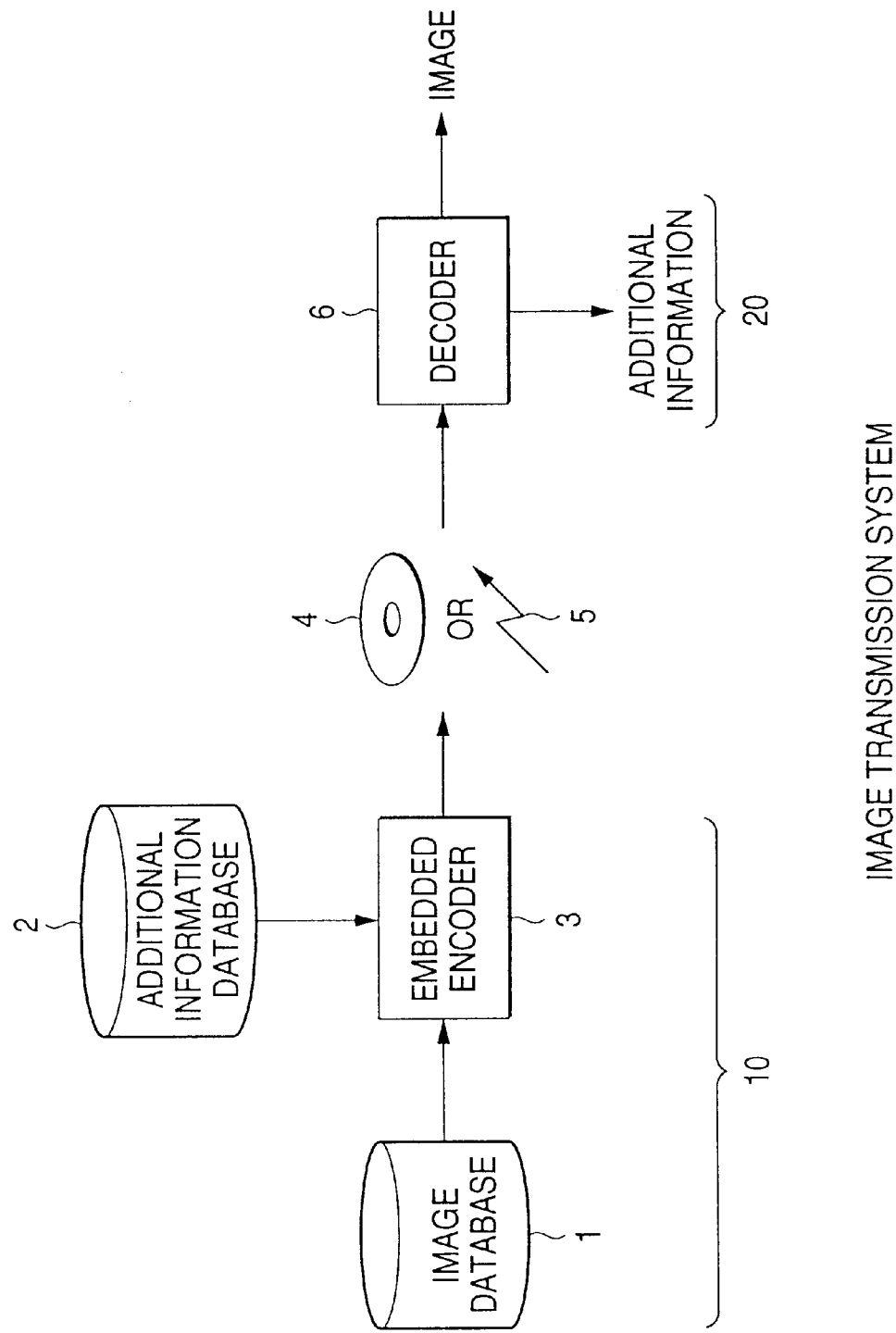
FIG. 1 is a block diagram showing an embodiment of an image transmission system to which the present invention is applied.

FIG. 1 shows an example configuration of an embodiment of an image transmission system to which the invention is applied. The term "system" means a logical collection of a plurality of devices and whether the constituent devices are contained in the same body is irrelevant to the definition of this term.

This image transmission system consists of a coding apparatus 10 and a decoding apparatus 20. The coding apparatus 10 codes an object of coding such as an image and outputs coded data. The decoding apparatus 20 decodes coded data into the original image.

An image database 1 stores images to be coded, for example, digital images. A stored image is read out from the image database 1 and supplied to an embedded encoder 3.

An additional information database 2 stores additional information, such as digital data, as information to be embedded into an image as a coding object. Stored additional information is read out from the additional information database 2 and supplied to the embedded encoder 3, too.

The embedded encoder 3 receives an image from the image database 1 and additional information from the additional information database 2. The embedded encoder 3 codes the image that is supplied from the image database 1 in accordance with the additional information that is supplied from the additional information database 2 in such a manner that decoding will be performed by utilizing an energy deviation of the image, and outputs a resulting image. That is, the embedded encoder 3 codes the image by embedding the additional information into the image in such a manner that decoding will be performed by utilizing an energy deviation of the image, and outputs coded data. The coded data that is output from the embedded encoder 3 is recorded on a recording medium 4 such as a semiconductor memory, a magneto-optical disc, a magnetic disk, an optical disc, a magnetic tape, or a phase change disc. Alternatively, the coded data is transmitted, as a signal, over a transmission medium 5 such as ground waves, a satellite channel, a CATV (cable television) network, the Internet, or public lines, and supplied to the decoding apparatus 20.

The decoding apparatus 20 is a decoder 6, which receives coded data that is supplied via the recording medium 4 or the transmission medium 5. The decoder 6 decodes the coded data into the original image and the additional information by utilizing an energy deviation of the image. The decoded image is supplied to a monitor (not shown), for example, and displayed thereon. The decoded additional information is text data, audio data, a reduced image, or the like that relates to the image.

Next, the principles of the embedded coding in the embedded encoder 3 shown in FIG. 1 and the decoding in the decoder 6 also shown in FIG. 1 will be described.

In general, what is called information has a deviation of energy or entropy and the deviation is recognized as valuable information. For example, the reason why an image that is obtained by photographing a certain scene is recognized by a human as an image of the scene is that the image, for example, pixel values of the respective pixels constituting the image, has an energy deviation corresponding to the scene. An image having no energy deviation is just noise or the like and is useless information.

Therefore, even if the original energy deviation of valuable information is, say, broken, by performing a certain manipulation on the information, the valuable information can be restored by restoring the original energy deviation from the broken one. That is, coded data obtained by coding information can be decoded into the original information by utilizing the original energy deviation of the information.

For example, the deviation of the energy of information is represented by correlation, continuity, similarity, etc.

The correlation of information means correlation between constituent elements (in the case of an image, pixels, lines, or the like that constitute the image), for example, autocorrelation, or distance between a certain constituent element and another one of the information. An example of correlation is correlation between two lines of an image that is a correlation value represented by the sum of the squares of the differences between corresponding pixel values.

Figure 2:
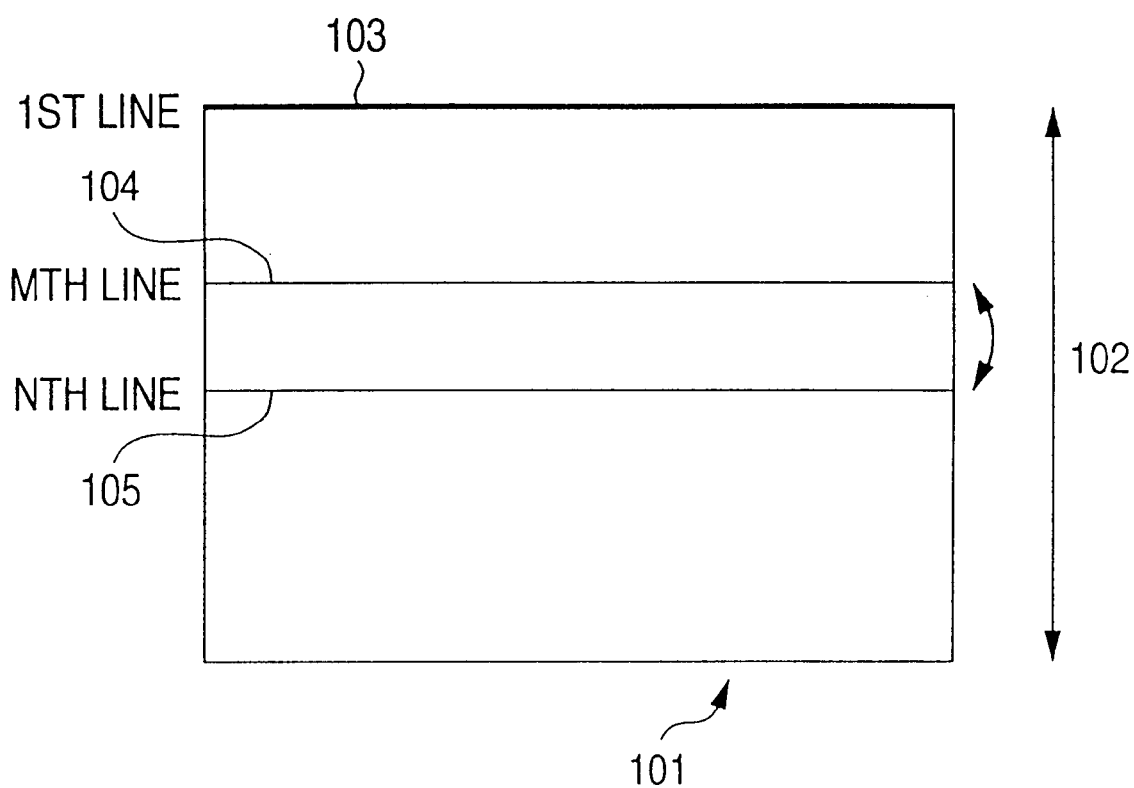
FIG. 2 shows an image an a coding object in the invention.
Figure 3A:
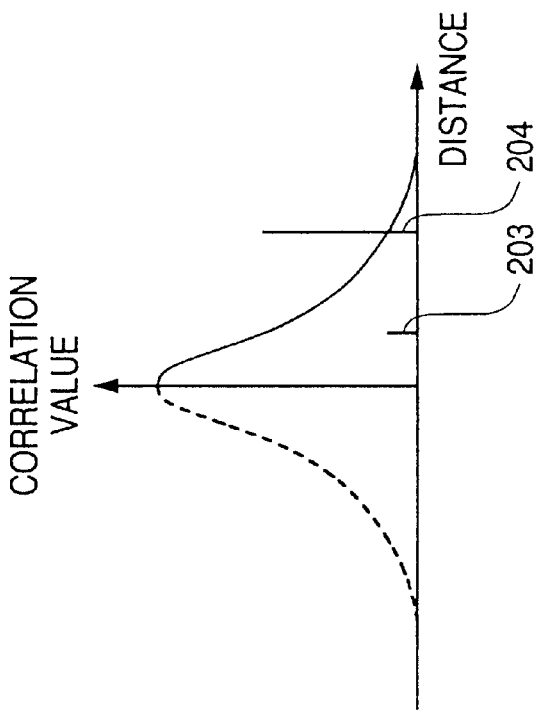
FIG. 3A is a conceptual diagram showing a state before an image is coded by utilizing correlation or a decoding result in the embodiment of the invention.

For example, now assume an image 101 formed by H lines 102 as shown in FIG. 2. In general, as shown in FIG. 3A, the correlation value between the first-row line (first line) 103 from the top of the image and each of the other lines is larger when the line is closer to the first line 103 (i.e., located higher in the image of FIG. 2) as indicated by a correlation value 201 with the Mth line, and is smaller when the line is more distant from the first line 103 (i.e., located lower in the image of FIG. 2) as indicated by a correlation value 202 with the Nth line. That is, there is a deviation of correlation values that the correlation value with the first line 103 is larger for a line closer to the first line 103 and smaller for a line more distant from the first line 103.

In the image 101 of FIG. 2, a manipulation is performed that interchanges the pixel values of the Mth line 104 that is relatively close to the first line 103 with those of the Nth line 105 that is relatively distant from the first line 103. Correlation values between the first line 103 and the other lines in the line-interchanged image 101 are as shown in FIG. 3B, for example.

In the line-interchanged image 101, the correlation value with the Mth line 104 that is close to the first line 103 becomes small as indicated by a correlation value 203 with the Mth line and the correlation value with the Nth line 105 that is distant from the first line 103 becomes large as indicated by a correlation value 204 with the Nth line.

Figure 3B:
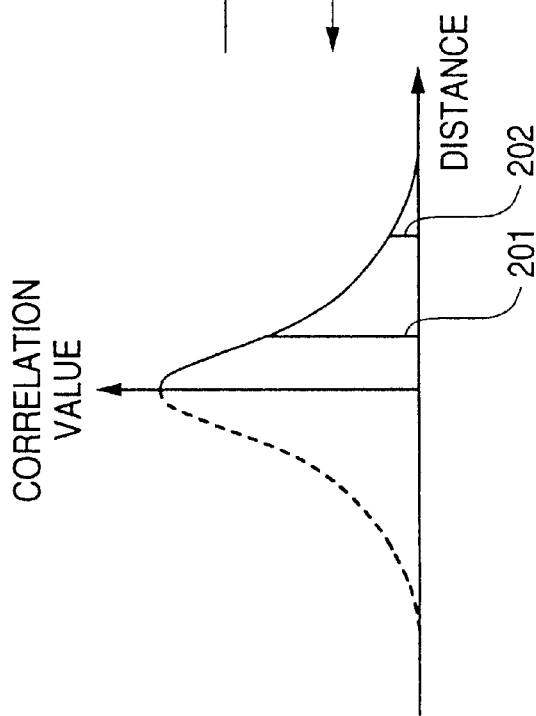
FIG. 3B is a conceptual diagram showing a result obtained by coding the image by utilizing correlation in the embodiment of the invention.

Therefore, in FIG. 3B, the deviation of correlation that the correlation value is larger for a line closer to the first line 103 and smaller for a line more distant from the first line 103 is broken. However, the broken deviation of correlation of the image can be repaired to the original state by utilizing the deviation of correlation that the correlation value is larger for a line closer to the first line 103 and smaller for a line more distant from the first line 103. In FIG. 3B, the facts that the correlation value with the Mth line 104 that is close to the first line 103 is small and the correlation value with the Nth line 105 that is distant from the first line 103 is large are clearly unnatural (A), and hence the original deviation of correlation is restored by interchanging the Mth line 104 and the Nth line 105 with each other. An image having the deviation of correlation shown in FIG. 3A, that is, the original image 101, is restored by interchanging the Mth line 104 and the Nth line 105 in FIG. 3B with each other.

In the case described above with reference to FIGS. 2, 3A and 3B, the image is coded by line interchanging. In the coding, for example, the embedded encoder 3 determines based on additional information which lines should be moved or which lines should be interchanged with each other. On the other hand, the decoder 6 restores the original image from a coded image, that is, a line-interchanged image, by moving the interchanged lines to their original positions by utilizing the correlation of the coded image. Further, in the decoding, at the same time, the decoder 6 restores additional information embedded in the image by detecting, for example, which lines were moved or which lines were interchanged with each other.

Figure 4A:
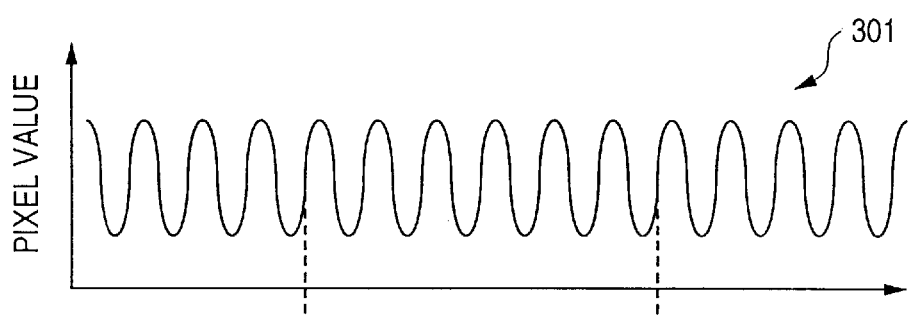
FIG. 4A shows a state before an image in coded by utilizing continuity or a decoding result in the embodiment of the invention.

As for the continuity of information, assume that for a certain line of an image, a waveform 301 as shown in FIG. 4A is observed in which the variation pattern of pixel values is continuous. In another line that is distant from the above line, a variation pattern of pixel values is observed that is different in continuity from the variation pattern of the above line; a deviation of continuity also exists. That is, when attention is paid to a certain pixel value variation pattern, a deviation of continuity is found that a similar pixel value variation pattern exists in an adjacent portion and the pixel value variation pattern becomes more different as the position goes away.

Figure 4B:
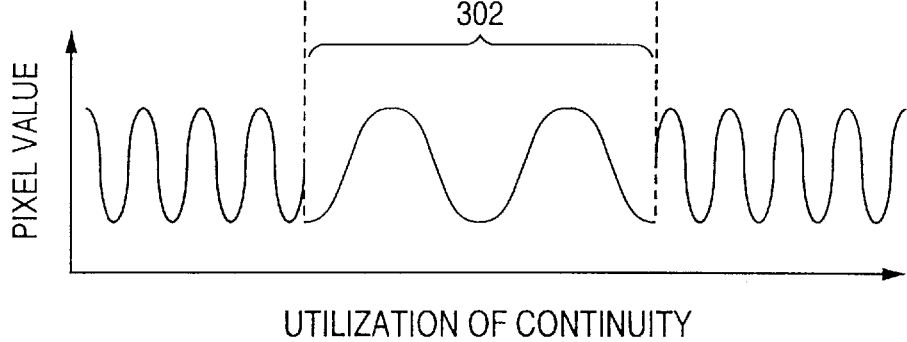
FIG. 4B shows a result obtained by coding the image by utilizing continuity in the embodiment of the invention.

For example, part of the waveform 301 shown in FIG. 4A in which the variation pattern of pixel values is continuous is replaced by a waveform 301 that is distant from the waveform 301 and has a different variation pattern of pixel values as shown in FIG. 4B.

In the case of FIG. 4B, the above-described deviation of continuity is broken. However, the broken deviation of continuity can be repaired by utilizing the deviation of continuity that portions adjacent to each other have continuous pixel value variation patterns and pixel value variation patterns become more different when they are more distant from each other. Specifically, in FIG. 4B, the pixel value variation pattern 302 of the part of the waveform is clearly different from the pixel value variation patterns of the other parts, and hence the deviation of continuity of the original image can be restored by replacing the pixel value variation pattern 302 with a waveform having a pixel value variation pattern similar to the pixel value variation patterns of the other parts. The waveform shown in FIG. 4A, that is, the original waveform, can be restored from the waveform shown in FIG. 4B by performing such replacement.

In the case described above with reference to FIGS. 4A and 4B, the image coding is to replace part of the waveform with a pixel value variation pattern that is much different from adjacent pixel value variation patterns. In the coding, for example, the embedded encoder 3 determines based on additional information what part of the waveform should be changed greatly in pixel value variation pattern and how greatly the pixel value variation pattern should be changed. The decoder 6 restores the original waveform from a coded signal, that is, a waveform having a part with a much different pixel value variation pattern by utilizing the deviation of continuity that adjacent pixel value variation patterns are continuous and pixel value variation patterns become more different when they are more distant from each other. Further, in the decoding, at the same time, the decoder 6 restores embedded additional information by detecting, for example, what part of the waveform was changed greatly in pixel value variation pattern and how greatly the pixel value variation pattern was changed.

As for the similarity of information, it is known that part of an image obtained by photographing a scene, for example, is generated by utilizing fractal, that is, autosimilarity, of the image. For example, a photographed image of a sea 401 and a forest 402 shown in FIG. 5A has a deviation of similarity that the similarity between the pixel value variation pattern of a portion of the sea 401 and that of another portion of the sea 401 is high but the similarity between the pixel value variation pattern of the same portion and that of a portion in the forest 402 that is distant from the sea 401 is low. The same thing is true of the similarity of a shape itself such as an edge shape pattern of an image portion rather than a pixel value variation pattern.

Figure 5A:
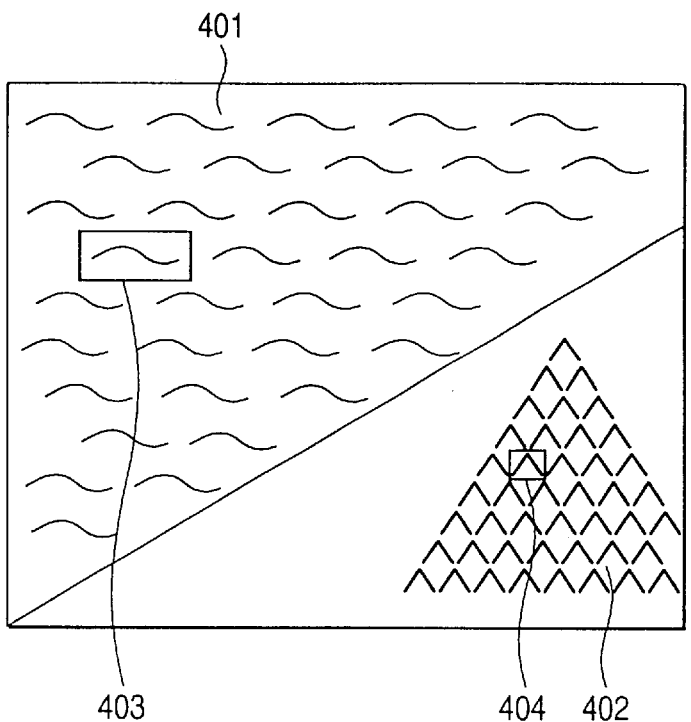
FIG. 5A shows a state before an image to coded by utilizing similarity or a decoding result in the embodiment of the invention.
Figure 5B:
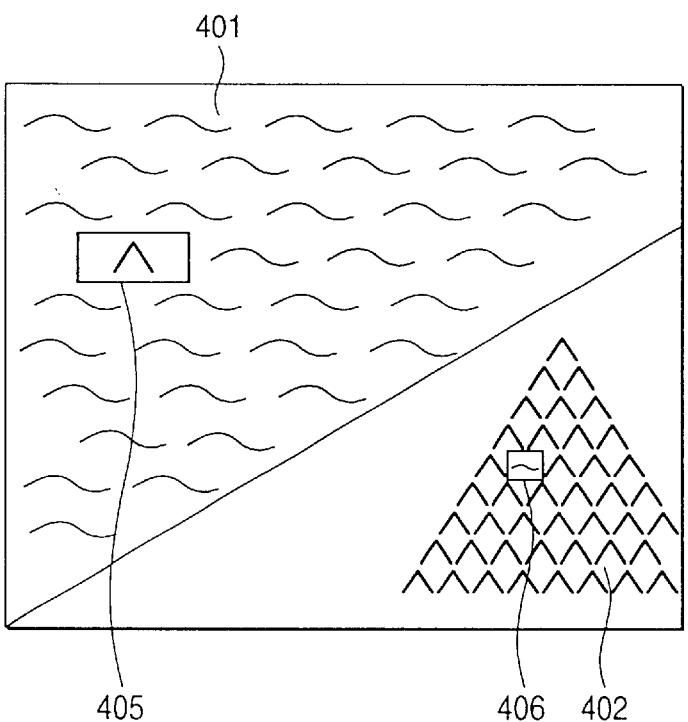
FIG. 5B shows a result obtained by coding the image by utilizing similarity in the embodiment of the invention.

For example, a part 403 of the sea 401 shown in FIG. 5A is replaced by a part 404 of the forest 402 as shown in FIG. 5B.

In FIG. 5B, the above-described deviation of similarity is broken. However, the broken deviation of similarity can be repaired by utilizing the deviation of similarity that adjacent pixel value variation patterns are high in similarity and the similarity becomes lower when pixel value variation patterns are more distant from each other. Specifically, in FIG. 5B in which part of image of the sea 401 is made a part 405 of the image of the forest 402, the similarity between a portion in the sea 401 and the replaced part 405 of the image of the forest 402 is clearly lower than the similarity between portions within the image of the sea 401. The deviation of similarity of the original image is restored by replacing the part 405 that is made the image of the forest 402 with an image having characteristics that are similar to those of an image of the sea 401 around that part 405, that is, a part 406 of the image of the sea 401. The image shown in FIG. 5A, that is, the original image, is restored from the image shown in FIG. 5B by performing such replacement.

In the case described above with reference to FIGS. 5A and 5B, the image coding is to replace the part 403 of the image of the sea 402 with the part 404 of the image of the forest 402. In the coding, for example, the embedded encoder 3 determines based on additional information what part (e.g., a position on the picture) of the image of the sea 401 should be replaced by the part 404 of the image of the forest 402. The decoder 6 restores the original image shown in FIG. 5A from a coded signal, that is, the image of the sea 401 having the part 405 of the image of the forest 402 by utilizing the deviation of similarity of the coded signal that adjacent pixel value variation patterns are high in similarity and the similarity becomes lower when pixel value variation patterns are more distant from each other. Further, in the decoding, at the same time, the decoder 6 restores embedded additional information by, for example, detecting what part of the image of the sea 401 was replaced by part of the image of the forest 402.

As described above, the embedded encoder 3 codes a coding object image in accordance with additional information so that decoding will be performed by utilizing an energy deviation of the image. The decoder 6 decodes coded data into the original image and the additional information without any overhead for decoding by utilizing an energy deviation of the image.

Since additional information is embedded into a coding object image, a resulting coded image is rendered different from the original state and unrecognizable as valuable information. That is, encryption of the coding object image without any overhead is realized.

Further, completely reversible digital watermarking is realized. For example, in the conventional digital watermarking, the lowest bits of pixel values that do not much influence the image quality are simply changed to values corresponding to a digital watermark. However, it is difficult to return the lowest bits to the original values. Therefore, changing the lowest bits as digital watermarking causes deterioration in the image quality of a decoded image. In the embedded coding of the invention, in the case where coded data is decoded by utilizing an energy deviation of the original image, the original image having no deterioration and additional information are obtained. Therefore, the image quality of a decoded image is not deteriorated even if the additional information is used as digital watermarking information.

Since embedded additional information is taken out by decoding coded data into an image, side information is provided without any overhead. In other words, since additional information is embedded into an image without any overhead that is usually necessary to take out the additional information, coded data that is obtained as a result of the embedding is compressed by an amount corresponding to the additional information. For example, if a half of an image is made a coding object and the other half is made additional information and if the latter half of the image is embedded into the half image as the coding object, the image is simply compressed into ½ of the original image.

Since coded data is decoded by utilizing an energy deviation of the original image which is, so to speak, a statistical quantity, the error resistance is high. That is, robust coding which is coding high in robustness is realized.

Since coded data is decoded by utilizing an energy deviation of the original image, there is a possibility that more additional information is embedded when the energy deviation is more characteristic, that is, when, in the case of an image, the activity of the image is higher or its redundancy is lower. As described above, coded data obtained as a result of embedding of additional information is compressed by an amount corresponding to the additional information. That is, the compression ratio is larger when the activity of the image is higher or the redundancy of the image is lower. For example, in the MPEG (Moving Picture Experts Group) scheme which is a conventional coding scheme, basically the compression ratio is smaller when the activity of an image is higher or the redundancy of an image is lower. The embedded coding scheme of the invention is much different from the conventional coding schemes in this respect.

An image can be provided with a voice used as a key by making an image a coding object and employing, as additional information, information of a different medium than an image, for example, a voice. Specifically, on the coding apparatus 10 side, a voice spoken by the subscriber, such as "Open sesame," is embedded as additional information into an image. On the decoding apparatus 20 side, a user is caused to speak a voice "Open sesame" and speaker recognition is performed by comparing the voice of the user with the voice embedded in the image. This speaker recognition allows automatic presentation of the image only when the user is recognized as the subscriber. A voice waveform itself, as well as what is called a feature parameter of a voice, can be used as a voice as additional information.

A voice can be provided with an image used as a key (e.g., voice response after face recognition) by making a voice a coding object and employing, as additional information, information of a media different than a voice, for example, an image. Specifically, on the coding apparatus 10 side, an image of the face of a user is embedded into, for example, a voice as a response to the user. On the decoding apparatus 20 side, the face of a user is photographed and a voice in which a face image that matches the photographed image is embedded is output. In this manner, a voice response system that makes voice responses that are different for respective users is realized.

It is also possible to embed information of a certain medium into another information of the same medium such as embedding one voice into another voice or embedding one image into another image. Further, by embedding a voice and a face image of the subscriber, what is called a double key system can be realized in which an image can be presented only when a voice and a face image of a user coincide with those embedded in the image.

For example, it is also possible that one of an image and a voice that constitute a television broadcast signal and are, so to speak, synchronized with each other is embedded into the other. In this case, what is called a true integrated signal can be realized in which pieces of information of different media are integrated with each other.

In the embedded coding scheme of the invention, as described above, more additional information may be embedded into information when the energy deviation of the information is more characteristic. Therefore, the overall data amount is controlled by, for example, adaptively selecting one of two pieces of information having a more characteristic energy deviation and embedding the other into the selected piece of information. That is, it becomes possible to cause one of two pieces of information to absorb the information quantity of the other. Controlling the overall data amount enables information transmission using a data amount that conforms to the transmission bandwidth and the use status of a transmission line and other factors of the transmission environment (i.e., environment-adaptive network transmission).

For example, coding in which higher-layer information having a smaller information quantity than lower-layer information is generated (what is called layered coding) is realized without increasing the data amount by embedding a reduced image into the original image or by embedding a decimated voice into the original voice.

For example, by embedding an image to serve as a key for retrieving each original image into each original image, a database is realized in which an image is retrieved based on a key image.

Figure 6:
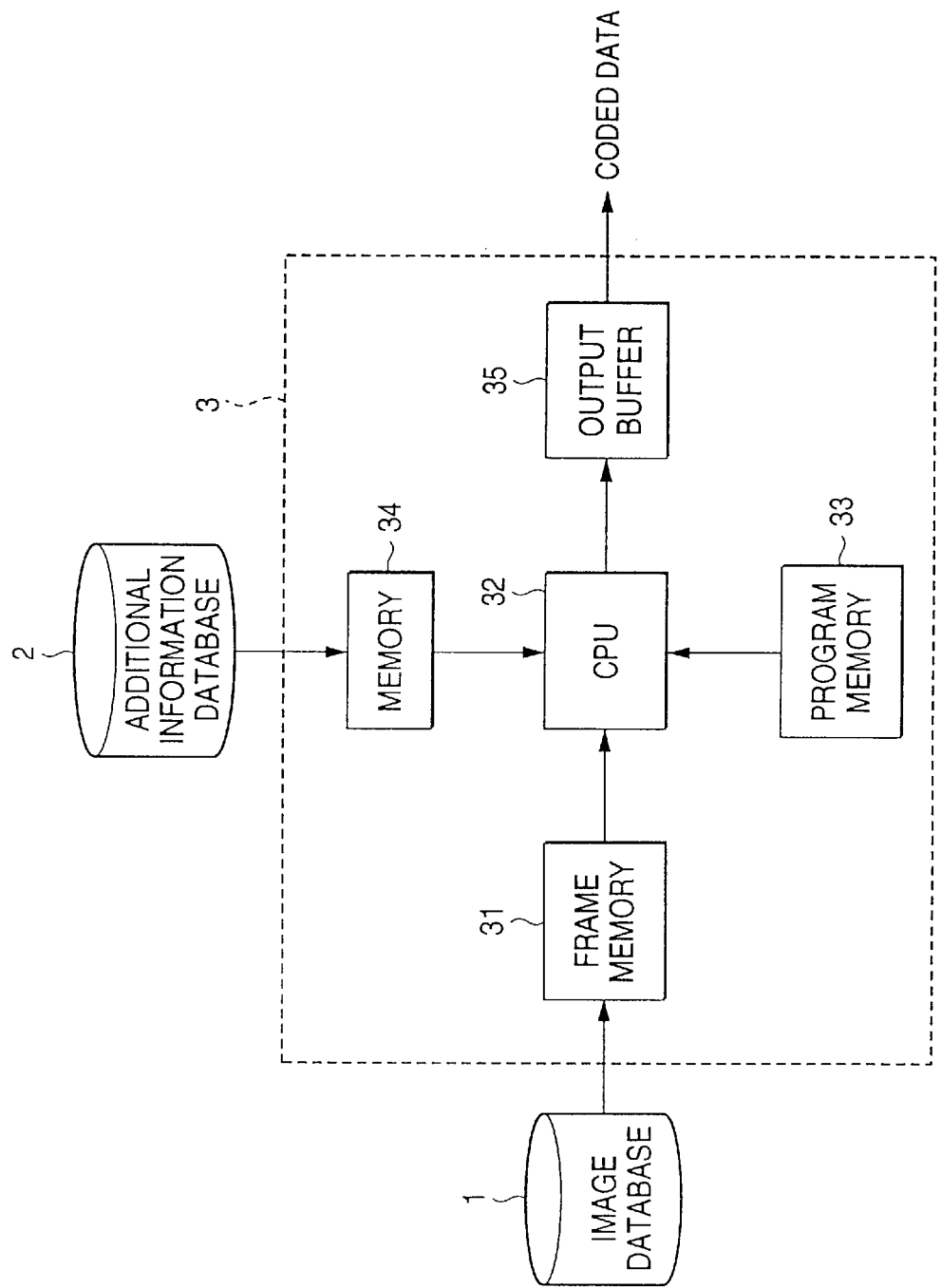
FIG. 6 is a block diagram showing an example hardware configuration of an embedded encoder 3 shown in FIG. 1.

FIG. 6 shows an example hardware configuration of the embedded encoder 3 shown in FIG. 1 which performs embedded coding in which additional information is embedded into an image so that the original image can be restored by utilizing the correlation of the image.

An image that is supplied from the image database 1 is supplied to a frame memory 31. The frame memory 31 temporarily stores, for example, on a frame-by-frame basis, the image supplied from the image database 1.

A CPU (central processing unit) 32 executes a program stored in a program memory 33 and performs controls so that an embedded coding operation (described later) is performed. That is, the CPU 32 receives additional information that is supplied from the additional information database 2 and controls the entire embedded encoder 3 according to the program so that the additional information is embedded into the image stored in the frame memory 31. Specifically, the CPU 32 performs controls so that the additional information is embedded into each column by rearranging the positions of the pixels that constitute the image stored in the frame memory 31 in accordance with the additional information on a column-by-column basis, for example (column: a vertical array of pixels). The CPU 32 performs a control so that an image in which the additional information is embedded is output as coded data.

Being a ROM (read-only memory) or a RAM (random access memory), for example, the program memory 33 stores a computer program for causing the CPU 32 to perform an embedded coding operation.

To be capable of storing a plurality of frames, the frame memory 31 is composed of a plurality of banks. By making switching among the banks, the frame memory 31 simultaneously perform storage of an image that is supplied from the image database 1, storage of an image as an object of an embedded coding operation of the CPU 32, and output of an image produced by the embedded coding operation, that is, coded data. Coded data is output on a real-time basis even if the image supplied from the image database 1 is a moving picture.

Figure 7:
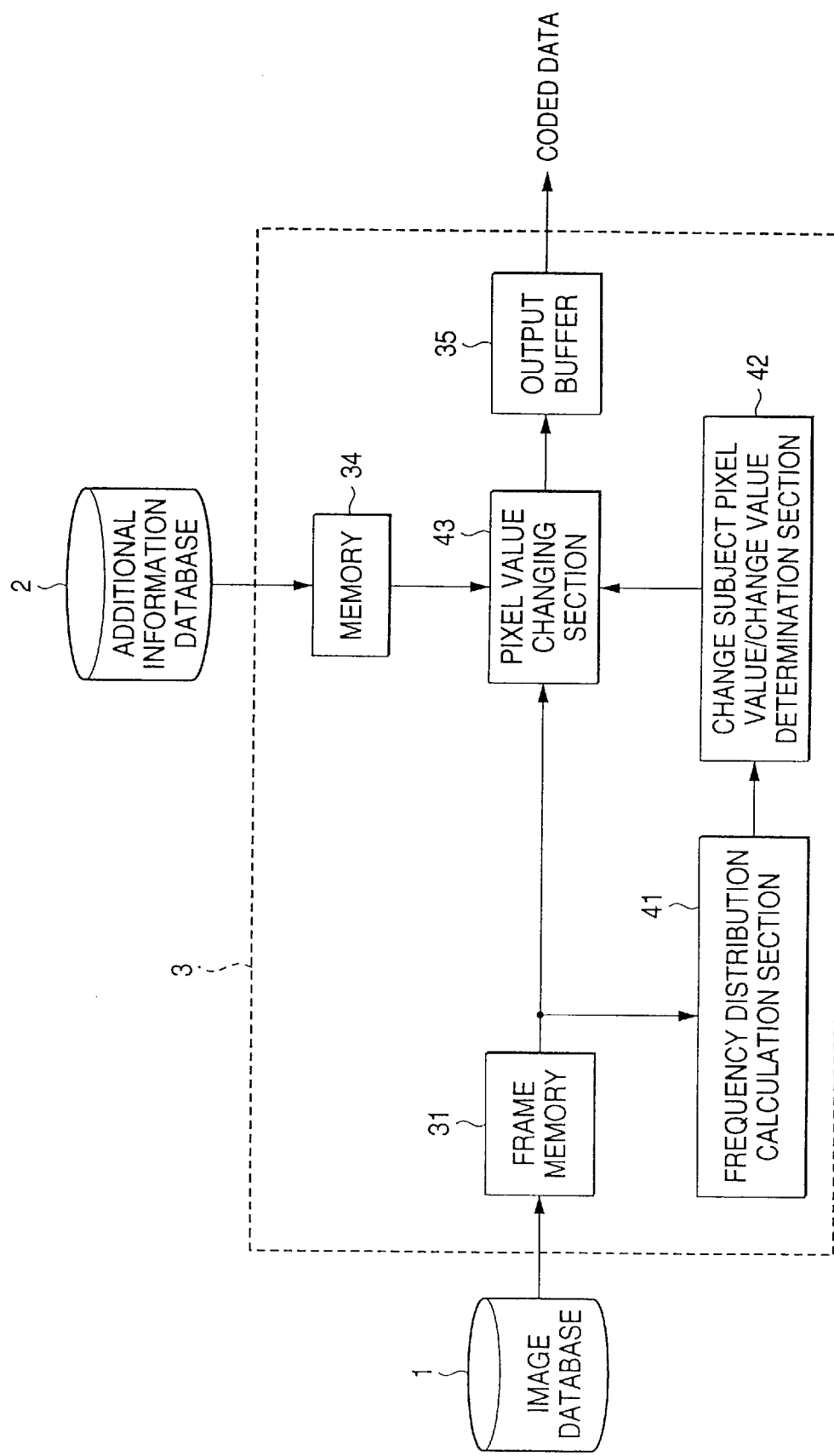
FIG. 7 is a block diagram showing an example functional configuration of the embedded encoder 3 of FIG. 6.

FIG. 7 shows an example functional configuration of the embedded encoder 3 of FIG. 6. The functional configuration shown in FIG. 7 is realized by the CPU 32's executing a computer program stored in the program memory 33.

A frame memory 31, a memory 34, and an output buffer 35 shown in FIG. 7 are the same as those described above with reference to FIG. 6, respectively.

A frequency distribution calculation section 41 calculates a frequency distribution of the pixel values of a coding object image that is stored in the frame memory 31 on a frame-by-frame basis, for example, and supplies it to a change subject pixel value/change value determination section 42. The change subject pixel value/change value determination section 42 determines a pixel value to be changed in accordance with additional information (i.e., a change subject pixel value) from among the pixel values constituting the coding object image that is stored in the frame memory 31 based on the frequency distribution of the pixel values supplied with the frequency distribution calculation section 41, and also determines a value to which a change should be made from the change subject pixel value (i.e., a change value). The change subject pixel value/change value determination section 42 supplies the determined change subject pixel value and change value to a pixel value changing section 43. The pixel value changing section 43 reads out the pixel values constituting a coding object frame that is stored in the frame memory 31 in prescribed order, for example, in raster scanning order. If a read-out pixel value is not equal to the change subject pixel value, the pixel value changing section 43 supplies it to the output buffer 35 as it is and has it stored therein at a corresponding address. If the read-out pixel value is equal to the change subject pixel value, the pixel value changing section 43 reads out additional information stored in the memory 34 and changes the pixel value from the change subject pixel value to the change value or leaves the pixel value as it is in accordance with the additional information. The pixel value changing section 34 supplies a resulting pixel value to the output buffer 35 and has it stored therein at a corresponding address.

Figure 8:
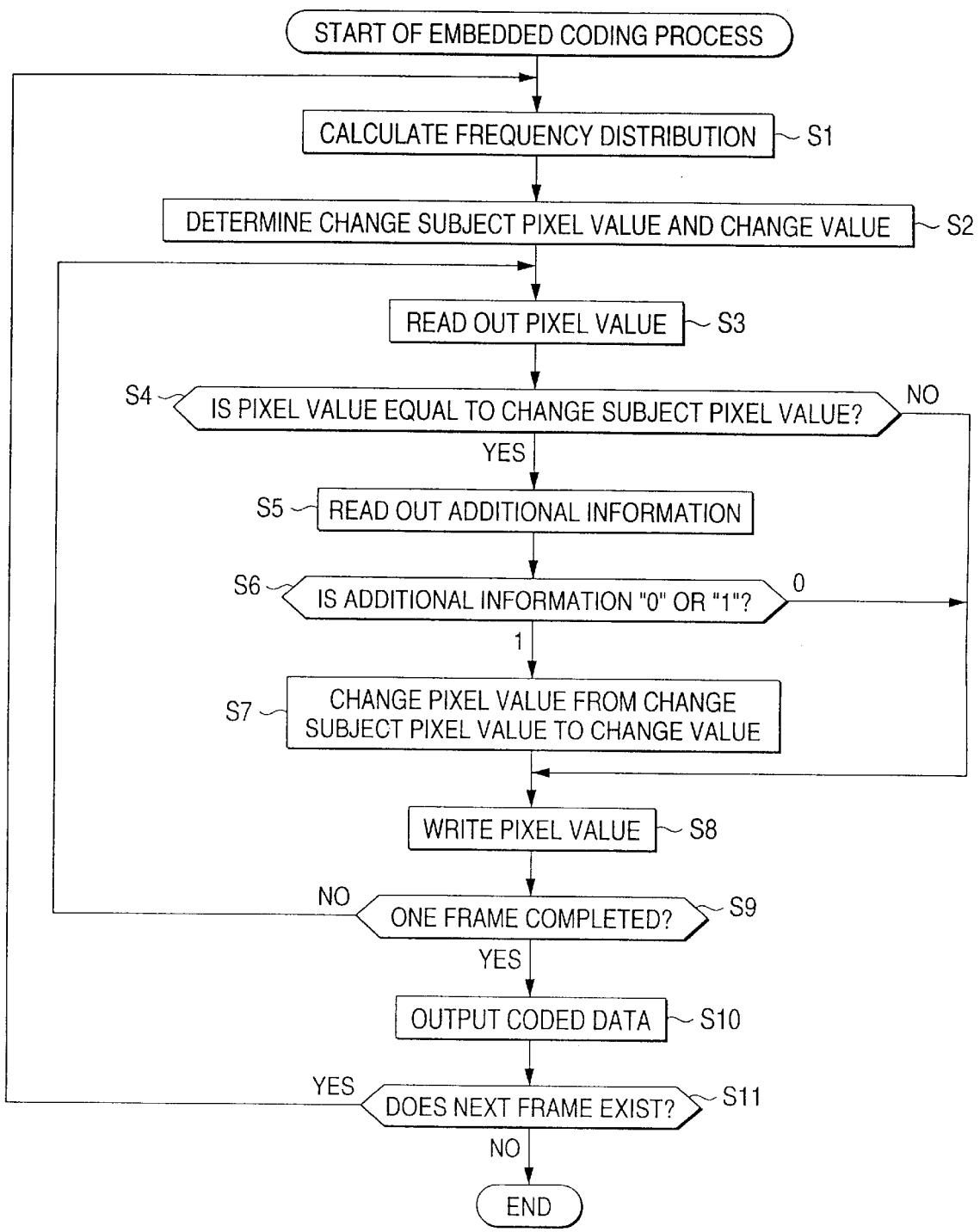
FIG. 8 is a flowchart showing a process that is executed by the embedded encoder 3 of FIG. 7.

Next, the embedded coding process that is executed in the embedded encoder 3 of FIG. 7 will be described with reference to a flowchart of FIG. 8.

Stored images are read out from the image database 1, sequentially supplied to the frame memory 31, and stored therein. Stored additional information is read out from the additional information database 2, sequentially supplied to the memory 34, and stored therein.

At step S1, the frequency distribution calculation section 41 reads out the pixel values constituting one coding object frame stored in the frame memory 31 and calculates its frequency distribution.

Figure 9:
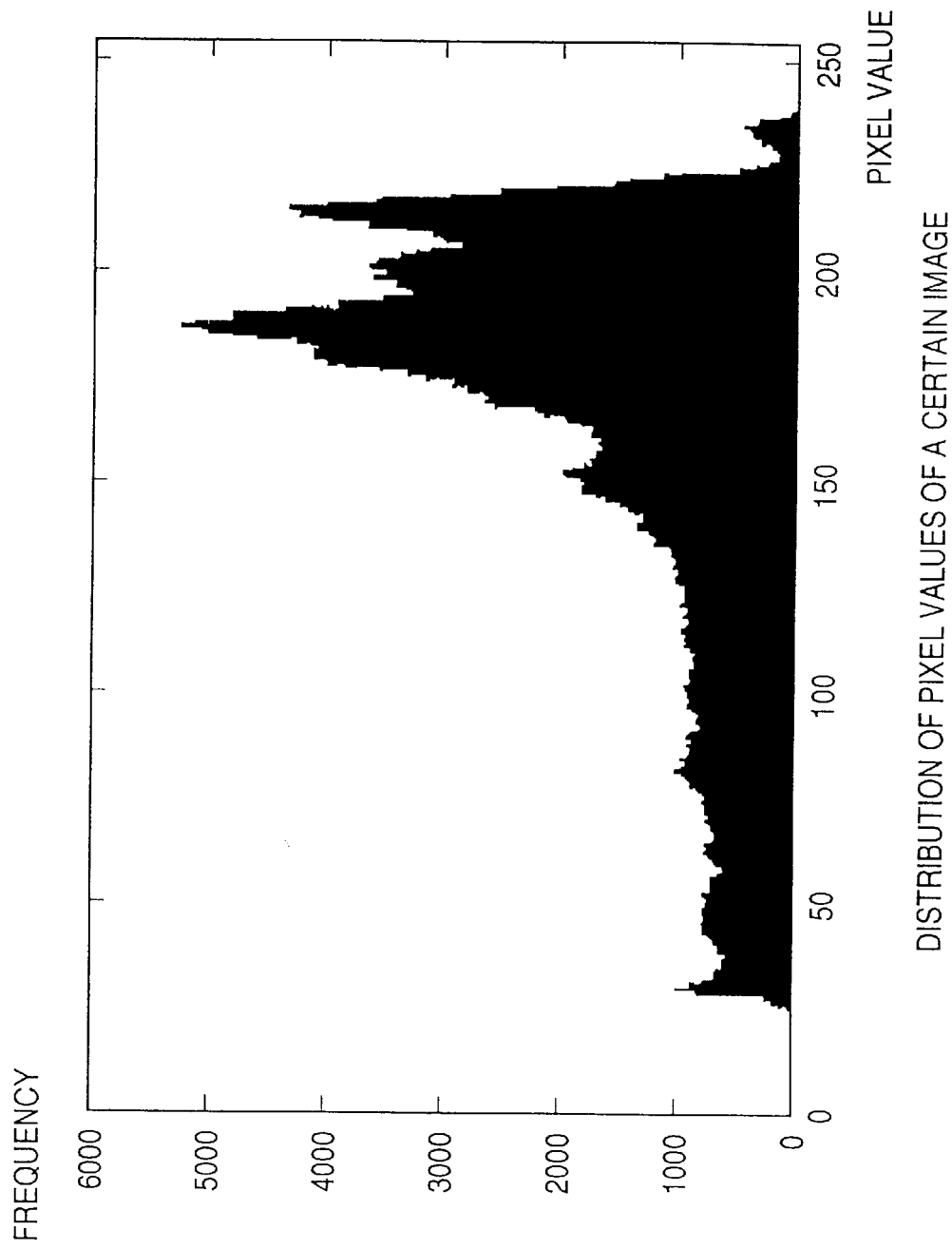
FIG. 9 shows a frequency distribution of the pixel values of a natural image.

FIG. 9 shows a frequency distribution of the pixel values of an actual image. FIG. 9 shows a frequency distribution of an R component of a one-frame image that is composed of R, G, and B component signals each being assigned 8 bits. The R component is assigned 8 bits as mentioned above and hence can take a pixel value in a range of 256 values of 0 to 255. However, in FIG. 9, there is no pixel having a pixel value of 250 or more. As is apparent from FIG. 9, in general, in an image, pixel values (in this example, each pixel value is one of 0 to 255) do not exist in similar numbers but there are pixel values that exist in a large number and pixel values that do not exist at all. However, in general, a frequency distribution of pixel values varies continuously.

The frequency distribution of the pixel values calculated by the frequency distribution calculation section 41 is supplied to the change subject pixel value/change value determination section 42. When the change subject pixel value/change value determination section 42 receives the frequency distribution of the pixel values, the process goes to step S2, where the change subject pixel value/change value determination section 42 determines, based on the frequency distribution, a change subject pixel value from among the pixel values constituting the coding object image that is stored in the frame memory 31 as well as a change value to which a change should be made from the change subject pixel value. For example, the change subject pixel value/change value determination section 42 detects a pixel value having the highest frequency from the frequency distribution and determines the detected pixel value as a change subject pixel value. Further, the change subject pixel value/change value determination section 42 detects a pixel value whose frequency is 0 from the frequency distribution and determines the detected pixel value as a change value. If there are a plurality of pixel values whose frequency is 0, the change subject pixel value/change value determination section 42 selects, for example, one of those pixel values and determines it as a change value.

In this embodiment, additional information is embedded into the change subject pixel value. To increase the data amount of additional information that can be embedded, the change subject pixel value/change value determination section 42 employs a pixel value having the highest frequency as a change subject pixel value. Therefore, the pixel value to be employed as a change subject pixel value is not limited to a pixel value having the highest frequency.

When the change subject pixel value and the change value are determined in the change subject pixel value/change value determination section 42, they are supplied to the pixel value changing section 43.

When receiving the change subject pixel value and the change value, at step S3 the pixel value changing section 43 reads out the value of the top-left-most pixel constituting the coding object frame that is stored in the frame memory 31. Then, the process goes to step S4, where the pixel value changing section 43 judges whether the pixel value that was read out at step S4 is equal to the change subject pixel value. If it is judged that the read-out pixel value is not equal to the change subject pixel value, the process goes to step S8 skipping steps S5 to S7. At step S8, the pixel value is supplied to the output buffer 35 as it is and written thereto at a corresponding address.

If the pixel value changing section 43 judges at step S4 that the pixel value that was read out at step S4 is equal to the change subject pixel value, the process goes to step S5, where the pixel value changing section 43 reads out additional information from the memory 34 and the process goes to step S6. It is assumed that at step S5 the additional information is read out on a bit-by-bit basis, for example.

At step S6, the pixel value changing section 43 judges whether the 1-bit additional information that was read out at step S5 is "0", or "1." If the pixel value changing section 43 judges at step S6 that the additional information is, say, "0" of "0" and "1," the process goes to step S8 skipping step S7. At step S8, the pixel value changing section 43 supplies the change object pixel value to the output buffer 35 as it is and writes it thereto at a corresponding address. That is, the additional information "0" is embedded into the pixel having the change subject pixel value by the pixel value changing section 43's not changing the pixel value that is equal to the change subject pixel value.

If the pixel value changing section 43 judges at step S6 that the additional information is, say, "1" of "0" and "1," the process goes to step S7, where the pixel value changing section 43 changes the pixel value from the change subject pixel value to the change value. Then, the process goes to step S8, where the pixel value changing section 43 supplies the change value to which a change was made at step S7 to the output buffer 35 and writes it thereto at a corresponding address. That is, the additional information "1" is embedded into the pixel having the change subject pixel value by the pixel value changing section 43's changing the pixel value that is equal to the change subject pixel value.

After execution of step S8, the process goes to step S9, where it is judged whether all of the pixels of the frame as the coding object have already been read out. If it is judged at step S9 that not all of the pixels of the frame as the coding object have been read out yet, the process returns to step S3, where the value of the pixel to be processed next according to raster scanning order is read out. Operations similar to the above are repeated thereafter.

If it is judged at step S9 that all of the pixels of the frame as the current coding object have already been read out, the process goes to step S10, where an additional-information-embedded frame that is stored in the output buffer 35 is read out as coded data and output therefrom. Then, the process goes to step S11, where it is judged whether a frame to be processed next is stored in the frame memory 31. If it is judged that such a frame is stored, the process returns to step S1 and operations similar to the above are repeated with the stored frame used as a coding object.

If it is judged at step S11 that no frame to be processed next is stored in the frame memory 31, the embedded coding process is finished.

According to the above embedded coding process, an image of a certain frame is coded into coded data in the following manner.

Figure 10A:
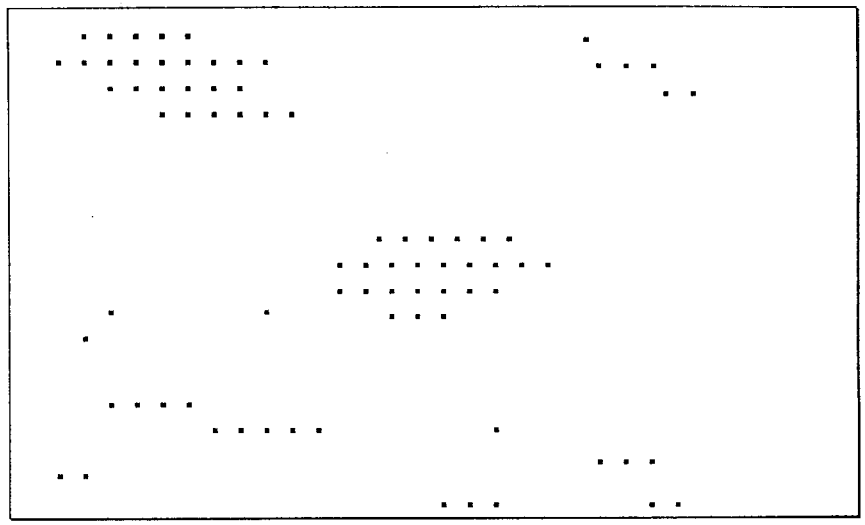
FIG. 10A shown change subject pixels of an embedded coding operation.
Figure 10B:
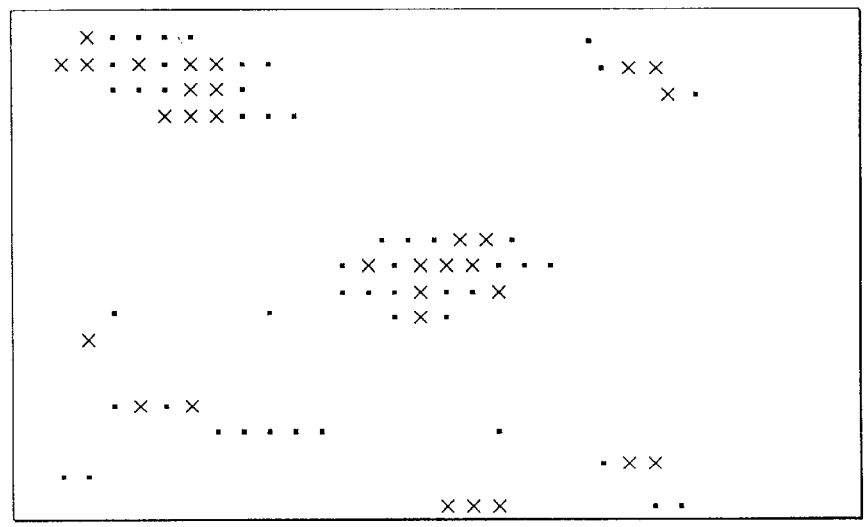
FIG. 10B shows a changed result of the change subject pixels of the embedded coding operation.

For example, if change subject pixel values are distributed in a coding object frame in a manner as indicated by mark "•" in FIG. 10A, the change subject pixel values are processed in raster scanning order in such a manner that part of them located at positions corresponding to additional information of "0" are left as they are and the other part located at positions corresponding to additional information of "1" are changed to a change value that is a pixel value not existent in the frame of FIG. 10A (i.e., a pixel value having a frequency 0 in the histogram) as indicated by mark "x" in FIG. 10B.

As described above, the embedded encoder 3 embeds additional information by changing, according to the additional information, a change subject pixel value that is a pixel value having the highest frequency among the pixel values constituting the image stored in the frame memory 31 to a change value that is a pixel value not existent in the image. Coded data in which the additional information is embedded is decoded into the original image as well as the additional information by changing the change value to the original change subject pixel value by utilizing the continuity of the image (i.e., the continuity of a frequency distribution of the pixel values that constitute the image). Therefore, the additional information is embedded into an image without deterioration in the image quality of the image and without increase in data amount.

That is, a pixel value to which a change was made by the pixel value changing section 43 can be decoded into the original pixel value without any overhead by utilizing the continuity of the image, that is, the continuity of a frequency distribution of the pixel values that constitute the image. The additional information can be restored by detecting the change value and the change subject pixel value. Therefore, a resulting decoded image has no deterioration in image quality due to embedding of the additional information.

If pixel values are changed from a change subject pixel value in a case where there is no pixel value that does not exist in a coding object frame, it is difficult to discriminate a changed pixel value from the pixel value that originally exists in the coding object frame and has the same value. In view of this, if the change subject pixel value/change value determination section 42 finds that there is no pixel value that does not exist in the coding object frame based on a frequency distribution that was calculated by the frequency distribution calculation section 41 at step S1 of the embedded coding process of FIG. 8, the pixel value changing section 43 does not embed additional information into that frame and further makes a judgment by employing the next frame as a coding object frame.

Figure 11:
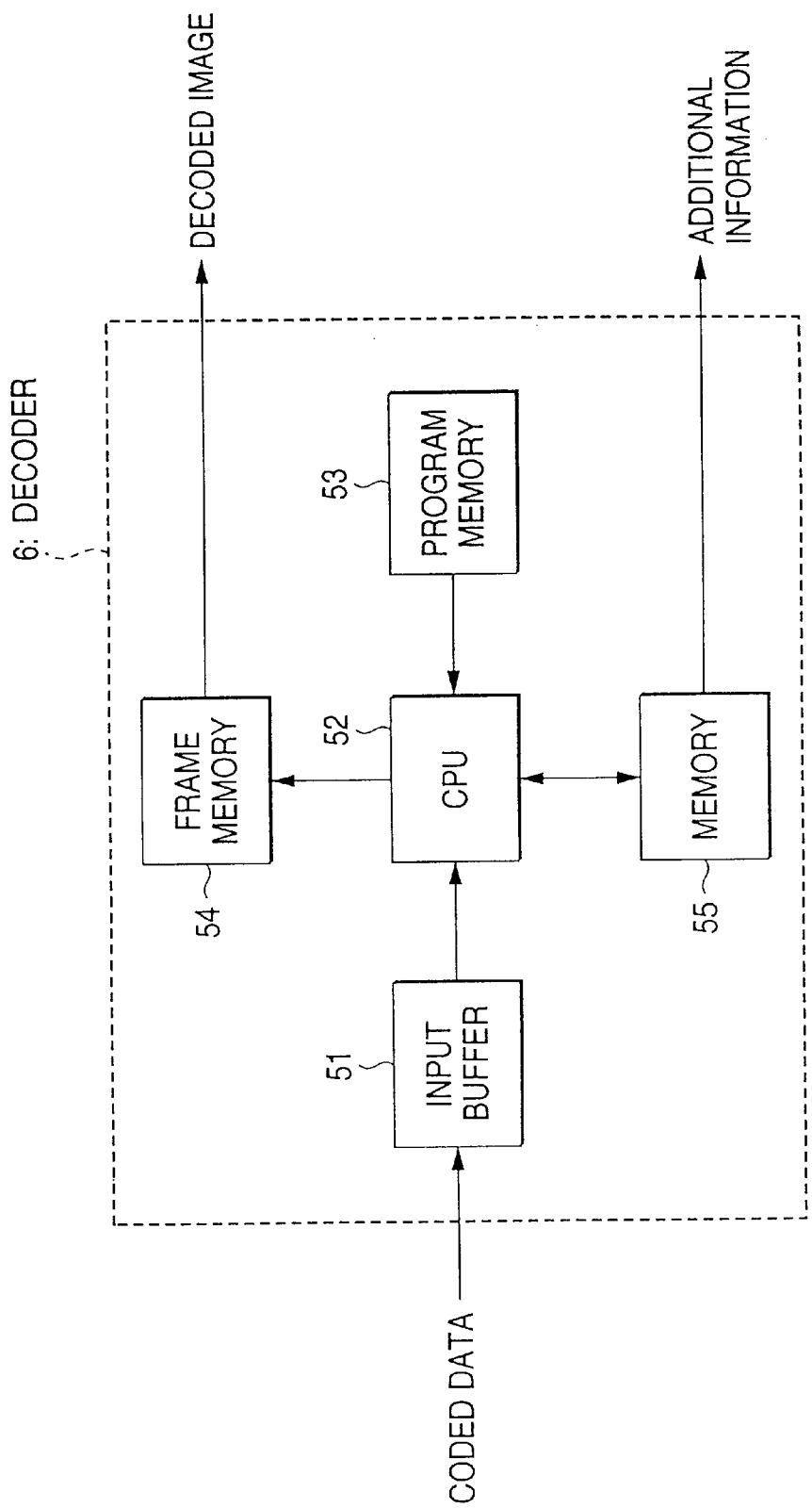
FIG. 11 is a block diagram showing an example hardware configuration of a decoder 6 shown in FIG. 1.

FIG. 11 shows an example configuration of the decoder 6 shown in FIG. 1 which decodes coded data that is output from the embedded encoder 3 of FIG. 7 into the original image and the additional information by utilizing the continuity of the image.

Coded data, that is, an image in which additional information is embedded (i.e., an embedded image), is supplied to an input buffer 51. The input buffer 51 temporarily stores the embedded image on a frame-by-frame basis, for example. Configured in the same manner as the frame memory 31 shown in FIG. 6, through bank switching, the input buffer 51 can process the embedded image on a real-time basis even if it is a moving picture.

A CPU 52 performs a decoding operation (described later) by executing a program stored in a program memory 53. That is, the CPU 52 decodes the embedded image that is stored in the input buffer 51 into the original image and the additional information by utilizing the continuity of the image. Specifically, the CPU 52 restores additional information by detecting change subject pixel values and change values from among the pixel values of the decoding object frame stored in the input buffer 51 and restores the original image by making changes from the change values to the change subject pixel value.

Configured in the same manner as, for example, the program memory 33 shown in FIG. 6, the program memory 53 stores a computer program and necessary data for causing the CPU 52 to perform a decoding operation.

A frame memory 54 stores, for example, on a frame-by-frame basis, an image restored by the CPU 52 and outputs it. A memory 55 temporarily stores additional information restored by the CPU 52 and outputs it.

Figure 12:
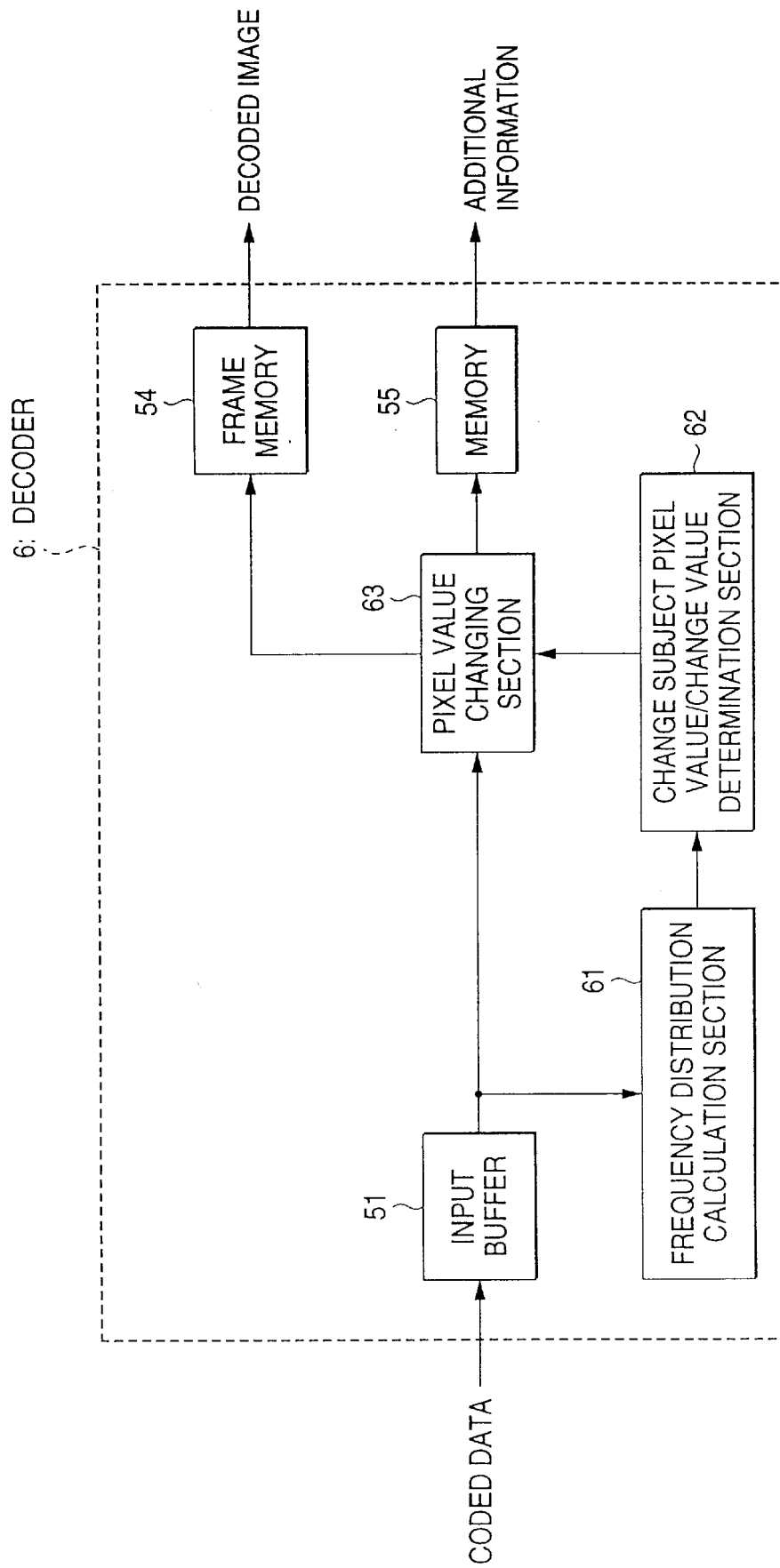
FIG. 12 is a block diagram showing an example functional configuration of the decoder 6 of FIG. 11.

FIG. 12 shows an example functional configuration of the decoder 6 of FIG. 11. The functional configuration shown in FIG. 12 is realized by the CPU 52's executing a computer program stored in the program memory 53.

An input buffer 51, a frame memory 54, and a memory 55 shown in FIG. 12 are the same as those described above with reference to FIG. 11, respectively.

A frequency distribution calculation section 61 reads out the pixel values that constitute the decoding object embedded image frame that is stored in the input buffer 51, calculates a frequency distribution, and supplies it to a change subject pixel value/change value determination section 62. The change subject pixel value/change value determination section 62 finds pixel values of a change subject pixel value and a change value that were determined in the embedded encoder 3 from among the pixel values constituting the embedded image based on the frequency distribution of the pixel values that is supplied from the frequency distribution calculation section 61, and supplies those to a pixel value changing section 63. The pixel value changing section 63 recognizes the change subject pixel value and the change value from the output of the change subject pixel value/change value determination section 62. The pixel value changing section 63 restores additional information that is embedded in the embedded image by detecting change subject pixel values and change values in the decoding object embedded image frame stored in the input buffer 51, and supplies the restored additional information to the memory 55. Further, the pixel value changing section 63 decodes the embedded image into the original image by changing making changes from the changes values in the embedded image to the change subject pixel value, and supplies the decoded image to the frame memory 54.

Next, the decoding process that is executed in the decoder 6 of FIG. 12 will be described with reference to a flowchart of FIG. 13.

The input buffer 51 sequentially stores, for example, on a frame-by-frame basis, embedded images (i.e., coded data) that are supplied thereto.

At step S21, the frequency distribution calculation section 61 reads out the decoding object embedded image frame stored in the input buffer 51, and determines a frequency distribution of the pixel values constituting the frame. The frequency distribution is supplied to the change subject pixel value/change value determination section 62.

When receiving the frequency distribution from the frequency distribution calculation section 61, at step S22 the change subject pixel value/change value determination section 62 finds, based on the frequency distribution, a change subject pixel value and a change value that were determined by the embedded encoder 3.

Figure 14A:
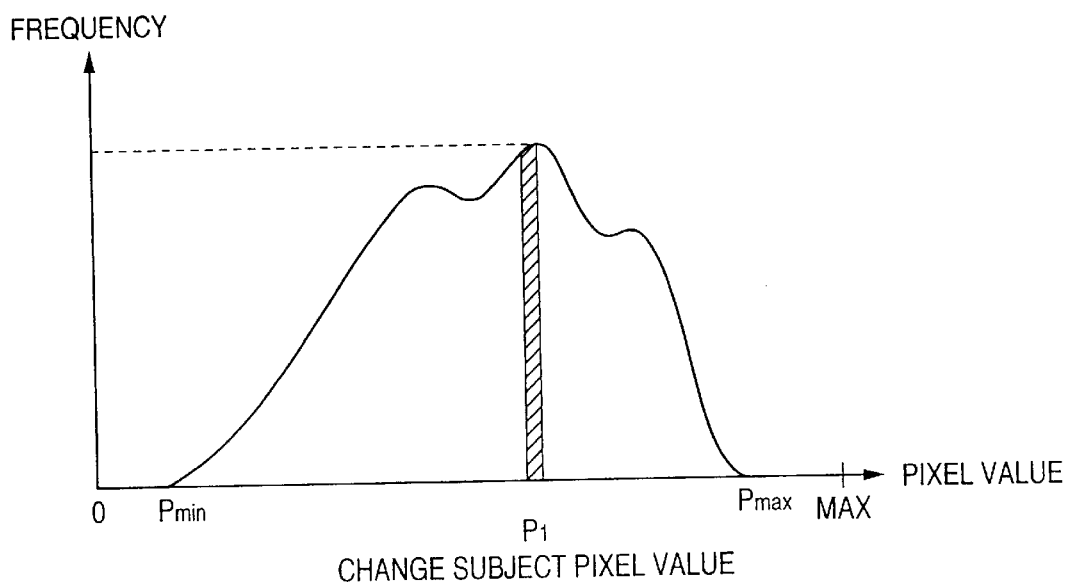
FIG. 14A shows a frequency distribution of the pixel values of an original image.

That is, if it is assumed that the pixel values constituting the original image that was coded into the embedded image has, for example, a continuous frequency distribution shown in FIG. 14A, the embedded encoder 3 determines a highest-frequency pixel value P, as a change subject pixel value. In FIG. 14A, the range of pixel values that can be taken is 0 to MAX and the original image does not have pixels whose pixel values are $P_{min}$ or less or $P_{max}$ or more $(0<P_{min}<P_{max}<MAX)$.

Figure 14B:
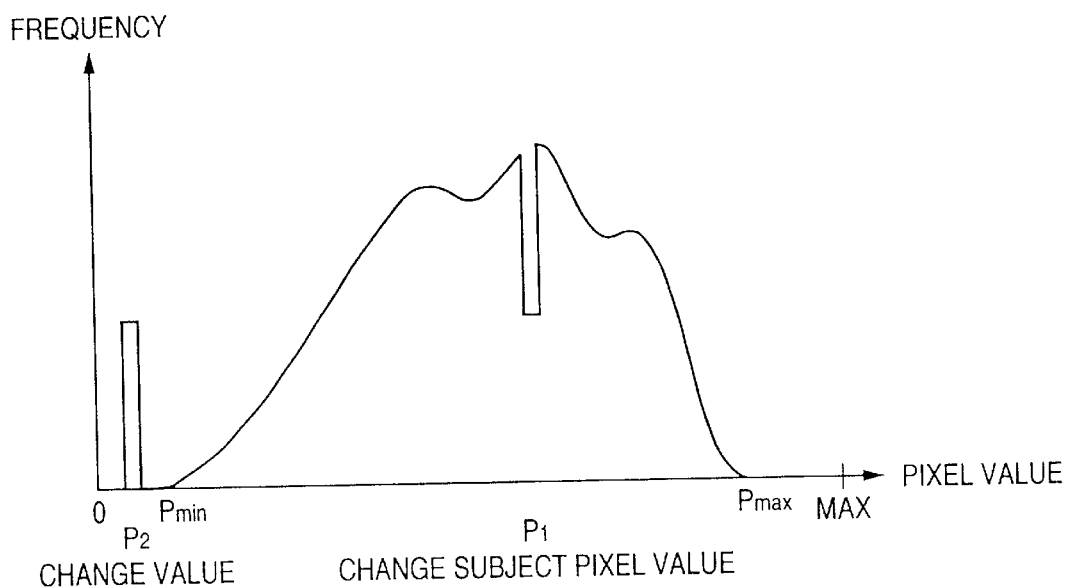
FIG. 14B shows a processing result of step S21 shown in FIG. 13.

If an embedded coding operation was performed by the embedded encoder 3 in such a manner that a certain pixel value $P_2$ that is $P_{min}$ or less and does not exist in the original image was determined as a change value, the pixel values of a resulting embedded image have a frequency distribution as shown in FIG. 14B, for example. The frequency of the change subject pixel value $P_1$ becomes extremely lower than the frequencies of nearby pixel values (e.g., the adjacent pixel values on both sides) and, conversely, the frequency of the change value $P_2$ becomes extremely higher than the frequencies of nearby pixel values.

Figure 15A:
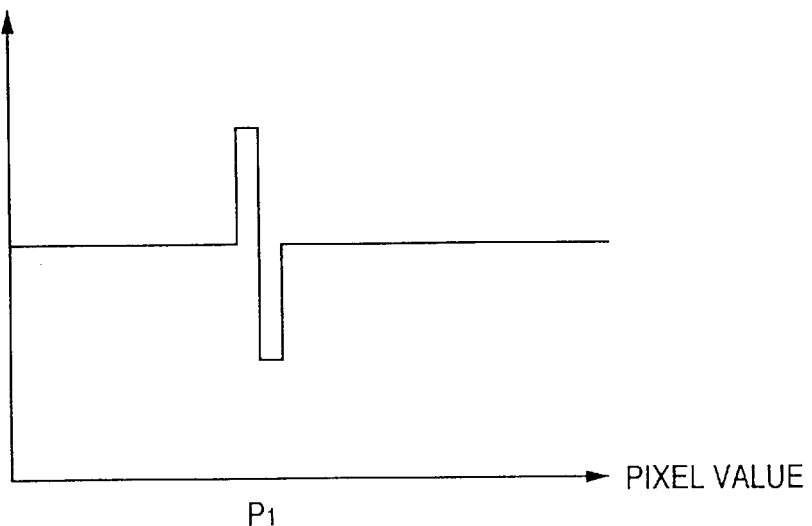
FIG. 15A is a first diagram illustrating step S22 shown in FIG. 13.
Figure 15B:
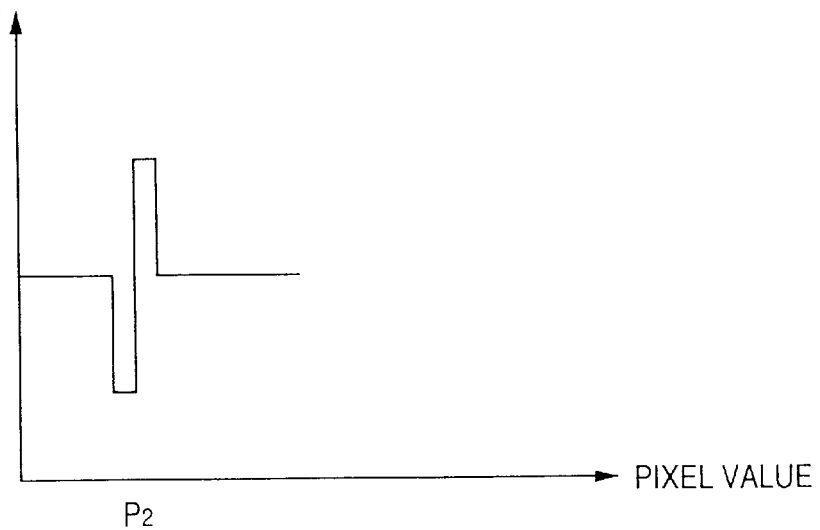
FIG. 15B in a second diagram illustrating step S22 shown in FIG. 13.

For example, if the difference between the frequency of pixel value n and the frequency of pixel value n+1 ((frequency of pixel value n)−(frequency of pixel value n+1), i.e., a frequency difference) in increasing order of the pixel value is calculated, the frequency difference becomes extremely large and then extremely small (i.e., becomes discontinuous) in the vicinity of the change subject pixel value $P_1$ (e.g., when n=$P_1$ and n+1=$P_1$) as shown in FIG. 15A. Further, the frequency difference becomes extremely small and then extremely large (i.e., becomes discontinuous) in the vicinity of the change value $P_2$ (e.g., when n=$P_2$ and n+1=$P_2$) as shown in FIG. 15B.

Therefore, the change subject pixel value and the change value that were determined by the embedded encoder 3 can be found by searching the frequency difference. In this manner, the change subject pixel value/change value determination section 62 finds, based on the frequency distribution of the pixel values of the embedded image, the change subject pixel value and the change value that were determined by the embedded encoder 3.

Returning to FIG. 13, the change subject pixel value/change value determination section 62 outputs the change subject pixel value and the change value that were determined by the embedded encoder 3 to the pixel value changing section 63. The process then goes to step S23.

At step S23, the pixel value changing section 63 reads out the value of the top-left-most pixel constituting the decoding object embedded image frame stored in the input buffer 51. The process then goes to step S24, where the pixel value changing section 63 performs a judgment on the read-out pixel value. If it is judged at step S24 that the read-out pixel value is neither the change subject pixel value nor the change value, the process goes to step S28, where the pixel value changing section 63 supplies the pixel value to the frame memory 54 and has it stored therein at a corresponding address. Since no additional information is embedded in a pixel that is neither the change subject pixel value nor the change value, it is not decoded.

If the pixel value changing section 63 judges at step S24 that the read-out pixel value is equal to the change subject pixel value, the process goes to step S25, where the pixel value changing section 63 supplies, as a decoding result of additional information, "0" (corresponding to the change subject pixel value) of "0" and "1" to the memory 55 and has it stored therein. Then, the process goes to step S28, where the pixel value changing section 63 supplies the change subject pixel value to the frame memory 54 as it is and has it stored therein at a corresponding address.

If the pixel value changing section 63 judges at step S24 that the read-out pixel value is equal to the change value, the process goes to step S26, where the pixel value changing section 63 changes the pixel value from the change value to the change subject pixel value, that is, to the original pixel value. The process then goes to step S27, where the pixel value changing section 63 supplies, as a decoding result of additional information, "1" (corresponding to the change value) of "0" and "1" to the memory 55 and has it stored therein. Then, the process goes to step S28, where the pixel value changing section 63 supplies the change subject pixel value (to which the pixel value was changed from the change value at step S26) to the frame memory 54 and has it stored therein at a corresponding address.

After execution of step S28, the process goes to step S29, where it is judged whether all of the pixels of the embedded image frame that is currently the decoding object have been read out. If it is judged at step S29 that not all of the pixels of the embedded image frame that is currently the decoding object have been read out yet, the process returns to step S23, where the value of the pixel to be processed next according to raster scanning order is read out. Operations similar to the above are repeated thereafter.

If it is judged at step S29 that all of the pixels of the embedded image that is the current decoding object have already been read out, a decoded image and additional information of one frame that are stored in the frame memory 54 and the memory 55, respectively, are read out and output. Then, the process goes to step S30, where it is judged whether an embedded image frame to be processed next is stored in the input buffer 51.

If it is judged that such a frame is stored, the process returns to step S21 and operations similar to the above are repeated with that frame used as a decoding object. If it is judged at step S30 that no embedded image frame to be processed next is stored in the input buffer 51, the decoding operation is finished.

As described above, the decoder 6 decodes coded data that is an image in which additional information is embedded into the original image and the additional information by utilizing the continuity of the image. Therefore, the coded data can be decoded into the original image and the additional information even without any overhead for decoding. Therefore, the decoded image does not have any deterioration due to embedding of the additional information.

In this embodiment, in the embedded coding process the pixel value changing section 43 leaves the pixel value equal to the change subject pixel value or changes it from the change subject pixel value to the change value in accordance with the additional information. However, when there are two or more pixel values that do not exist in a coding object image, it is possible to employ, for example, two of those pixel values as the first change value and the second change value and cause the pixel value changing section 43 to change the pixel value from the change subject pixel value to the first or second change value in accordance with the additional information. Where the pixel value changing section 43 leaves the pixel value equal to the change subject pixel value or changes it from the change subject pixel value to the change value, presence of one pixel value that does not exist in a coding object image is sufficient. On the other hand, where the pixel value changing section 43 changes the pixel value from the change subject pixel value to the first or second change value, it is necessary that there be two or more pixel values that do not exist in a coding object image. The change subject pixel value disappears in an embedded image in the case where the pixel value changing section 43 changes the pixel value from the change subject pixel value to the first or second change value. Therefore, in the decoder 6, the change subject pixel value is found more accurately based on a frequency distribution of the embedded image.

Where there are a plurality of pixel values that do not exist in a coding object image, it is possible for the pixel value changing section 43 to employ all the plurality of pixel values as change values and change the pixel value from the change subject pixel value to one of those change values in accordance with the additional information. In this case, additional information of two or more bits is embedded for each pixel.

Although in this embodiment in the embedded coding process the pixel values of a coding object image are processing in raster scanning order, the order of processing is not limited to the line scanning order. That is, since the only requirement is that the pixel values to be subjected to the frequency distribution calculation be read out, the pixel values may be processed in the column direction or in an oblique direction.

Although in this embodiment the frequency distribution calculation section 41 determines a frequency distribution on a frame-by-frame basis, a frequency distribution may be determined in other ways. For example, one frame may be divided into several blocks and a frequency distribution may be determined on a block-by-block basis, or a frequency distribution may be determined on a plural frame basis.

Although in this embodiment the decoder 6 finds the change subject pixel value and the change value that were determined by the embedded encoder 3, the change subject pixel value and the change value may be included in an embedded image as overhead because they are data of a slight amount.

For example, where an object image of embedded coding is a color image that consists of R, G, and B component signals, it is possible for the embedded encoder 3 to perform an embedded coding operation for each of R, G, and B.

No particular limitations are imposed on the type of additional information. For example, an image, a voice, a text, a computer program, a control signal, and other kinds of data may be used as additional information. If part of an image in the image database 1 is made additional information and the remaining part is supplied to the frame memory 31, the part of the image as the additional information is embedded into the remaining part and hence image compression is realized.

Although in this embodiment the object of processing is an image, it may be a voice etc.; that is, it may be any of media having a continuous histogram shape.

Although in this embodiment additional information itself is embedded, a feature quantity of additional information, such as a histogram, DR, variance, etc., may be embedded.

Figure 16:
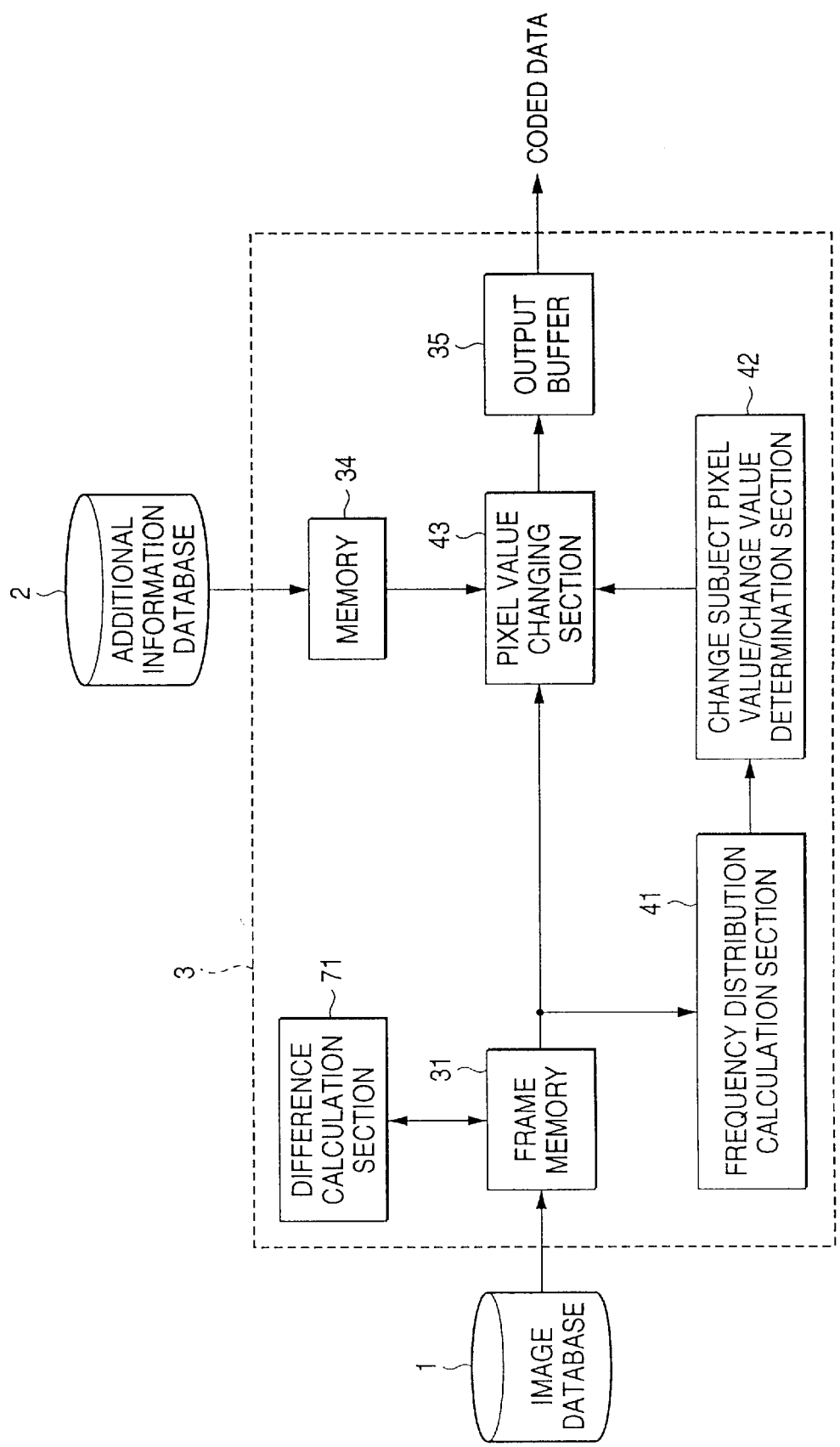
FIG. 16 is a block diagram showing another example functional configuration of the embedded encoder 3 of FIG. 6.

FIG. 16 shows a second example functional configuration of the embedded encoder 3 of FIG. 6. The components in FIG. 16 having the corresponding components in FIG. 7 are given the same reference numerals as the latter and descriptions therefor will be omitted where appropriate. That is, the embedded encoder 3 of FIG. 16 is configured in the same manner as that of FIG. 7 except that the former is newly provided with a difference calculation section 71.

The difference calculation section 71 employs, as a reference pixel, a pixel that is close spatially or temporally to each pixel constituting the coding object image stored in the frame memory 31, calculates difference data corresponding to the difference between each object pixel value and the reference pixel value, and stores the difference in the frame memory 31.

For example, the difference calculation section 71 employs, as a reference pixel, the pixel that is located immediately on the left of each pixel constituting the coding object image, subtracts the pixel value of the reference pixel from each object pixel value, and stores a subtraction result in the frame memory 31 as difference data. Therefore, in the embodiment of FIG. 16, the above-described embedded coding process is executed on an image (i.e., a difference image) that consists of such difference data in the frequency distribution calculation section 41, the change subject pixel value/change value determination section 42, and the pixel value changing section 43.

Figure 17:
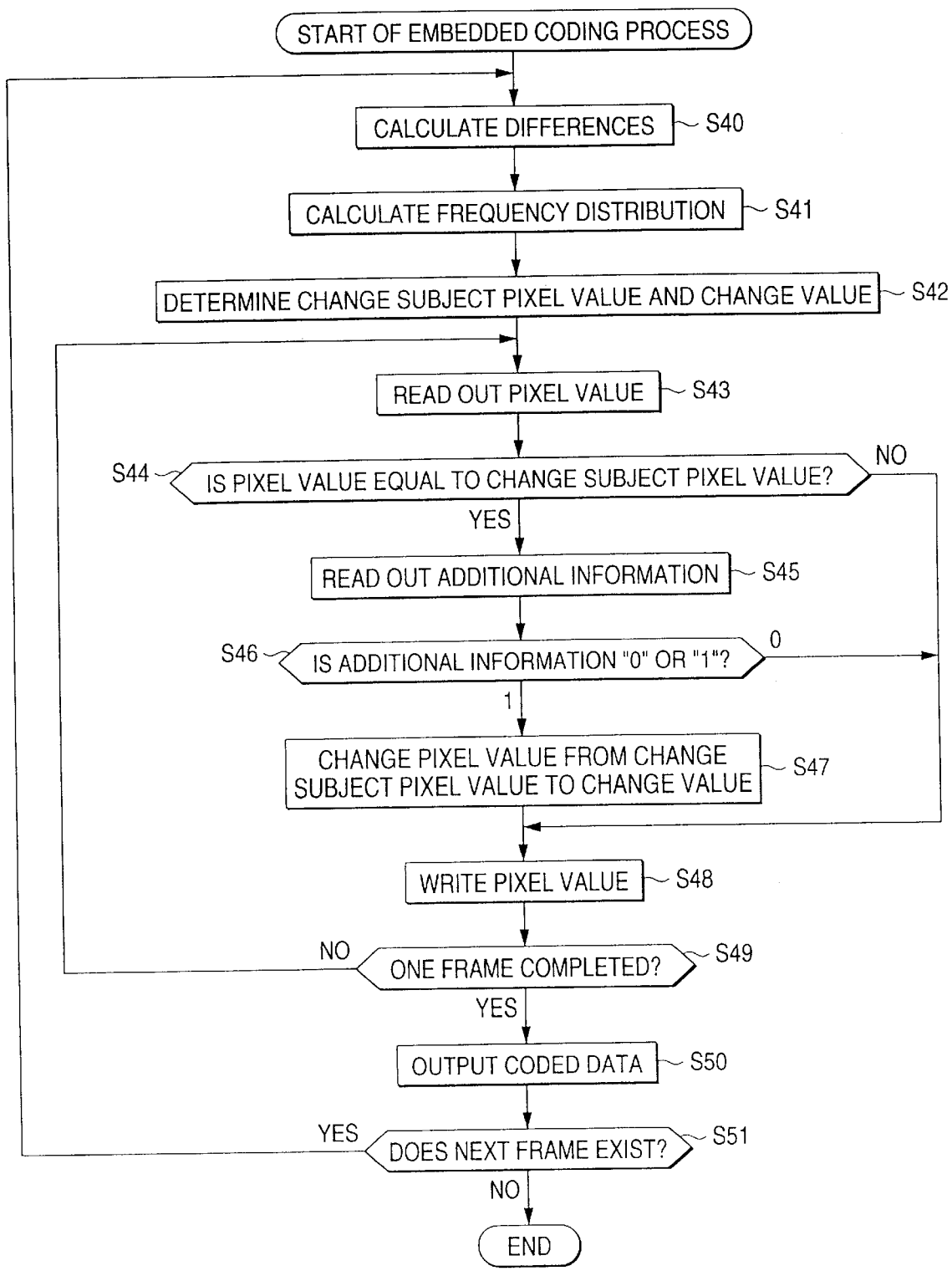
FIG. 17 is a flowchart showing a process that in executed by the embedded encoder 3 of FIG. 16.

Next, the embedded coding process that is executed in the embedded encoder 3 of FIG. 16 will be described with reference to a flowchart of FIG. 17.

In the embedded encoder 3 of FIG. 16, first, at step S40, the difference calculation section 71 subtracts the pixel value of the pixel that is located immediately on the left of each pixel constituting the coding object image stored in the frame memory 31 from each pixel, and stores subtraction results as difference data.

Operations similar to those performed at steps Si to S11 shown in FIG. 8 are performed in steps S41 to S51, respectively, whereby an embedded coding process similar to that described above with reference to FIG. 8 is executed on difference data and additional information is embedded.

More efficient embedded coding can be performed by the embedded encoder 3 by embedding additional information into difference data obtained by subtracting the pixel values of reference pixels from those of object pixel values rather than into the object pixel values themselves.

This will be explained below. In the above example, the difference calculation section 71 employs, as a reference pixel, the pixel that is located immediately on the left of each pixel constituting the image, and calculates difference data by subtracting the pixel value of the reference pixel from that of each object pixel. Since the difference between the pixel values of adjacent pixels is generally small, difference data is concentrated in a region close to 0.

Where additional information is embedded into difference data, the number of difference data having the highest frequency that are made change subject pixel values is much larger than in the case where additional information is embedded into pixel values themselves. A large amount of additional information can be embedded into such an enormous number of difference data.

Figure 18:
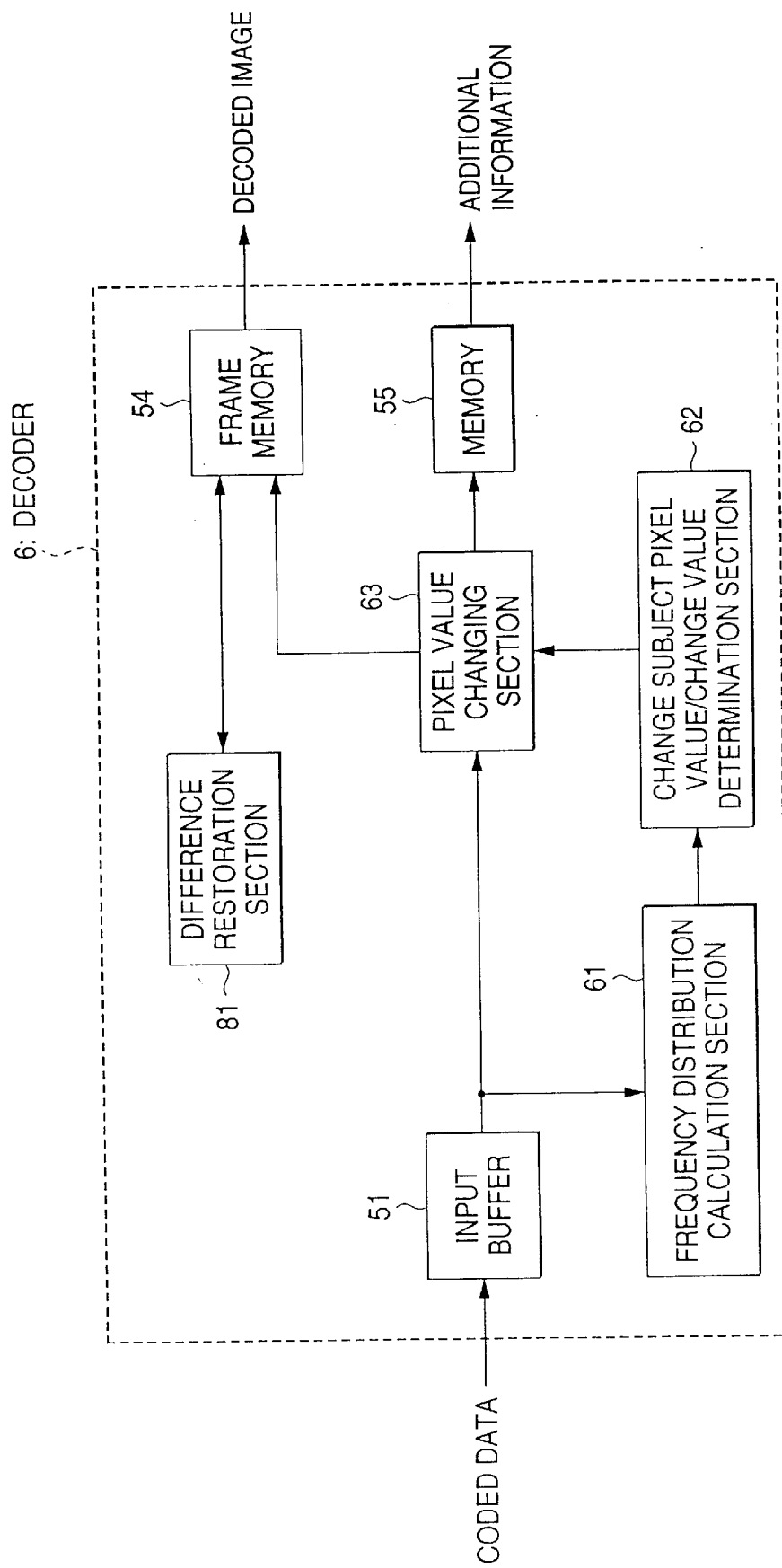
FIG. 18 is a block diagram showing another example functional configuration of the decoder 6 of FIG. 12.

FIG. 18 shows an example functional configuration of the decoder 6 which decodes coded data that is output from the embedded encoder 3 of FIG. 16. The components in FIG. 18 having the corresponding components in FIG. 12 are given the same reference numerals as the latter and descriptions therefor will be omitted where appropriate. That is, the decoder 6 of FIG. 18 is configured in the same manner as that of FIG. 12 except that the former is newly provided with a difference restoration section 81.

The difference restoration section 81 restores a difference image that consists of difference data stored in the frame memory 54 into the original image. The difference restoration section 81 adds, to each difference data stored in the frame memory 54, the pixel value of the pixel that was used as a reference pixel in calculating each difference data, and writes a resulting addition value to the frame memory 54 as the original pixel value.

Figure 19:
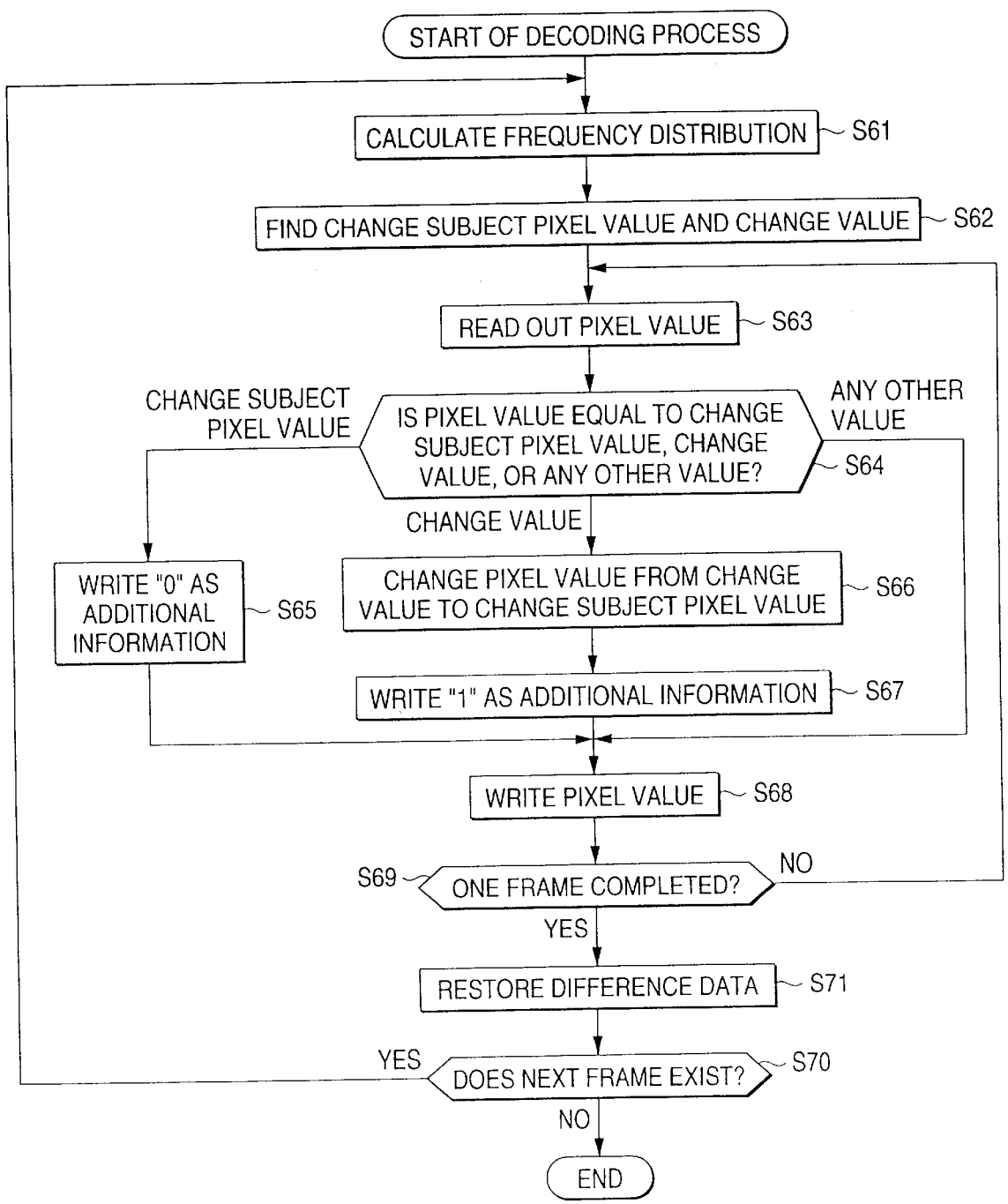
FIG. 19 is a flowchart showing a process that is executed by the decoder 6 of FIG. 18.

Next, the decoding process that is executed in the decoder 6 of FIG. 18 will be described with reference to a flowchart of FIG. 19.

Figure 13:
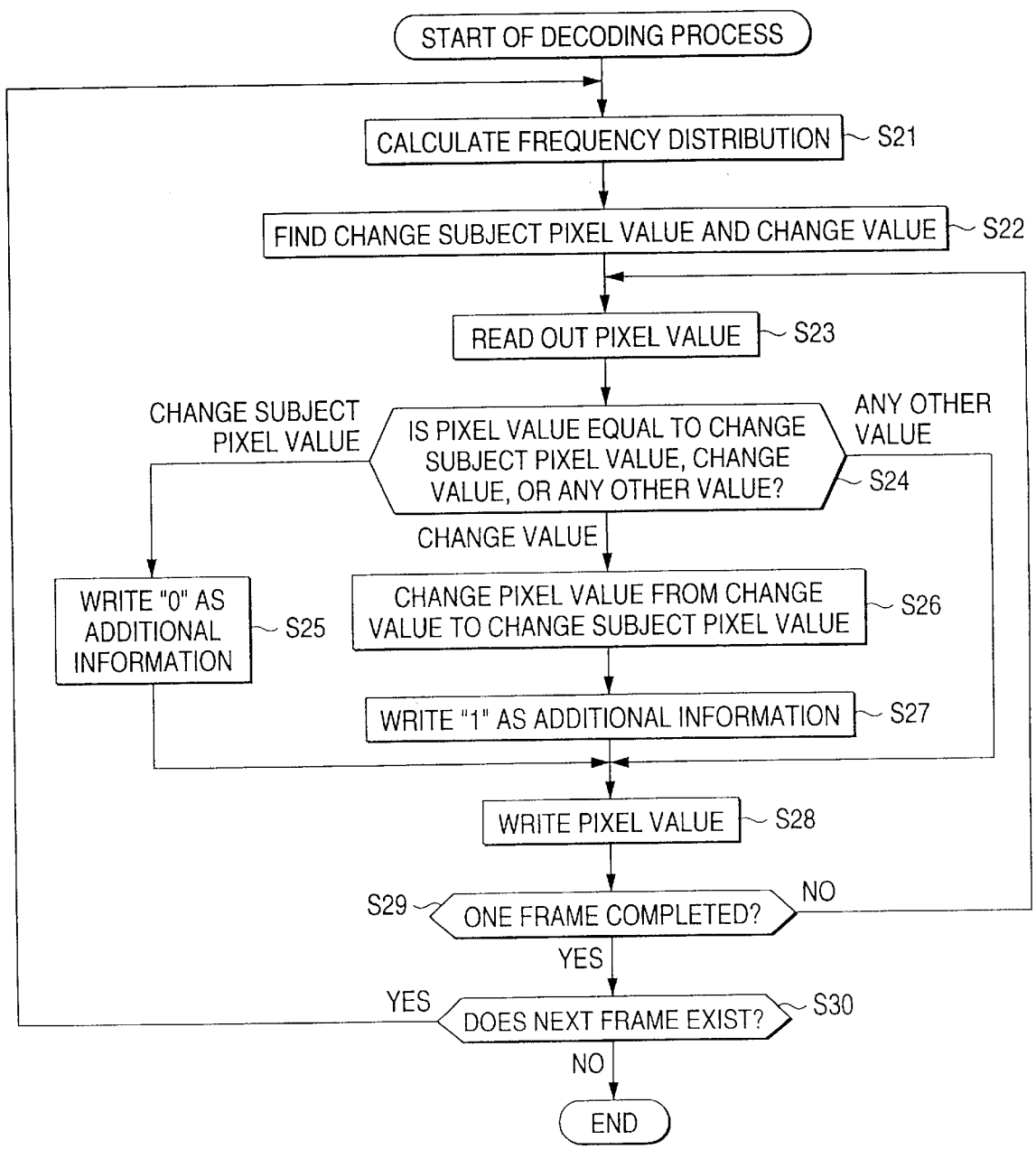
FIG. 13 is a flowchart showing a process that is executed by the decoder 6 of FIG. 12.

In the decoder 6 of FIG. 18, operations similar to those performed in steps S21 to S30 shown in FIG. 13 are performed in steps S61 to S70, respectively, on coded data that was produced by embedding additional information into a difference image in the above-described manner. At step S71, which is executed between step S69 and S70, the difference restoration section 71 restores the difference data that is stored in the frame memory 54 to the original pixel values and writes those to the frame memory 54.

As described above, coded data that is output from the embedded encoder 3 of FIG. 16 is such that additional information is embedded in difference data. Each difference data is written to the frame memory 54 as a result of execution of steps S61 to S68 that are similar to the respective steps S21 to S28 shown in FIG. 13 on the coded data. At step S71, the difference restoration section 81 adds, to the difference data, the pixel value of the pixel that was used as a reference pixel in calculating the difference data and writes a resulting addition value to the frame memory 54 as the original pixel value. Each original pixel value that has been written to the frame memory 54 is not only output as a decoding result of the image but also used as a reference pixel for restoration of the difference data of the pixel located immediately on the right of the original pixel value.

The above-described decoding process allows decoding of an image in which a large amount of additional information is embedded into the original image and the additional information.

Difference data C is given by the equation C=A−B where A represents the pixel value of an embedded coding object pixel and B represents the pixel value of the reference pixel that is located immediately on the left of the coding object pixel.

Difference data C, which is a simple difference between pixel values, is represented by a maximum of N+1 bits if each pixel constituting a coding object image is represented by N bits. For example, if each pixel is represented by 8 bits, that is, as a value in a range of 0 to 255, a simple difference between pixels has a value in a range of −255 to +255 and 9 bits are required to express such a value. The fact that the number of bits of difference data is larger than that of the original pixel values means an increase in the data amount of the embedded coding object and hence is not preferable.

Such an increase in the number of bits can be prevented if, for example, each difference data is expressed as shown in FIGS. 20A and 20B.

If a reference pixel value B is smaller than or equal to a coding object pixel value A, the reference pixel value B is subtracted from the coding object pixel value A and a resulting subtraction value itself is made difference data C. For example, if a coding object pixel value A is 200 and a reference pixel value B is 10, 200−10=190 is made difference data C as shown in FIG. 20A.

On the other hand, if a reference pixel value B is smaller than a coding object pixel value A, as shown in FIG. 20B, the reference pixel value B is subtracted from the coding object pixel value A, a certain value is added to a resulting subtraction value, and an addition result is made difference data C. That is, where each pixel value is represented by N bits, $2^N$ is added to a subtraction value obtained by subtracting a reference pixel value B from a coding object pixel value A and an addition result is made difference data C. For example, if each pixel value is represented by 8 bits and a coding object pixel value A and a reference pixel value B are 10 and 200, respectively, $10-200+2^8=66$ is made difference data C as shown in FIG. 20B.

The number of bits of difference data C that is calculated in the above manner remains the same as that of the original pixel value. If original pixels are represented by N bits, difference data is also represented by N bits. Therefore, increase of the amount of embedded coding object data can be prevented.

Difference data C as described above is restored to the original pixel value (i.e., the coding object pixel value) A in the following manner.

First, difference data C is added to a reference pixel value B to obtain an addition value. If pixel values are represented by N bits and if the addition value is smaller than or equal to $2^N-1$, the addition value itself is made a restoration result of the original pixel value A.

On the other hand, if the addition value of the difference data C and the reference pixel value B is larger than $2^N-1$, $2^N$ is subtracted from the addition value and a resulting subtraction value is made a restoration result of the original pixel value A.

As described above, the difference between a certain pixel value A and another pixel value B is expressed without increasing the number of bits and the difference can be restored to the original pixel value A.

Next, a difference calculation process that is executed in the difference calculation section 71 shown in FIG. 16 to calculate difference data having the expression described above with reference to FIGS. 20A and 20B will be described with reference to a flowchart of FIG. 21.

In the difference calculation process, first, at step S81, it is judged whether the pixel value A of the coding object pixel is larger than or equal to (or larger than) the pixel value B of the reference pixel. If it is judged at step S81 that the pixel value A is larger than or equal to the pixel value B, the pixel value B is subtracted from the pixel value A and a resulting subtraction value is output as difference data C and written to the frame memory 31.

On the other hand, if it is judged at step S81 that the pixel value A is not larger than or equal to (or not larger than) the pixel value B, the process goes to step S84, where the pixel value B is subtracted from the pixel value A. Further, at step S84, if N bits are assigned to the pixel values, $2^N$ is added to a subtraction value of the pixel values A and B and a resulting addition value is output as difference data C and written to the frame memory 31.

Next, a difference restoration process that is executed in the difference restoration section 81 shown in FIG. 18 to restore difference data C having the expression described above with reference to FIGS. 20A and 20B to the original pixel value A will be described with reference to a flowchart of FIG. 22.

In the difference restoration process, first, at step S91, the difference data C is added to the pixel value B of the pixel that was used as a reference pixel in calculating the difference data C (in this embodiment, the pixel immediately on the left of the pixel corresponding to the difference data C) to obtain an addition value A'. The process then goes to step S92, where, if N bits are assigned to the pixel values, it is judged whether the addition value A' calculated at step S91 is smaller than or equal to $2^N-1$. If it is judged at step S92 that the addition value A' is smaller than or equal to $2^N-1$, the process goes to step S93, where the addition value Al itself is output as the original pixel value A and written to the frame memory 54.

On the other hand, if it is judged at step S92 that the addition value A' is not smaller than or equal to $2^N-1$ (i.e., the addition value A' is larger than the values that are expressed by N bits), the process goes to step S94, where $2^N$ is subtracted from the addition value A' and a resulting subtraction value is made the original pixel value A. The process then goes to step S95, where the difference restoration section 81 outputs the original pixel value A and writes it to the frame memory 54.

By using difference data having the above expression, efficient embedded coding is performed while increase in data amount due to calculation of differences between pixel values is prevented.

Figure 23A:
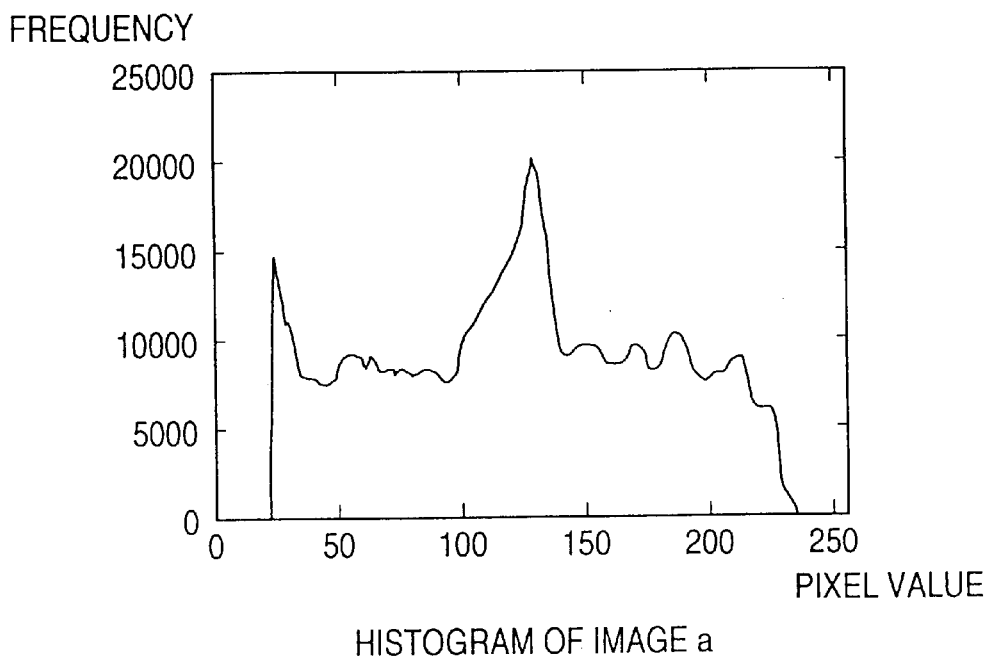
Figure 23B:
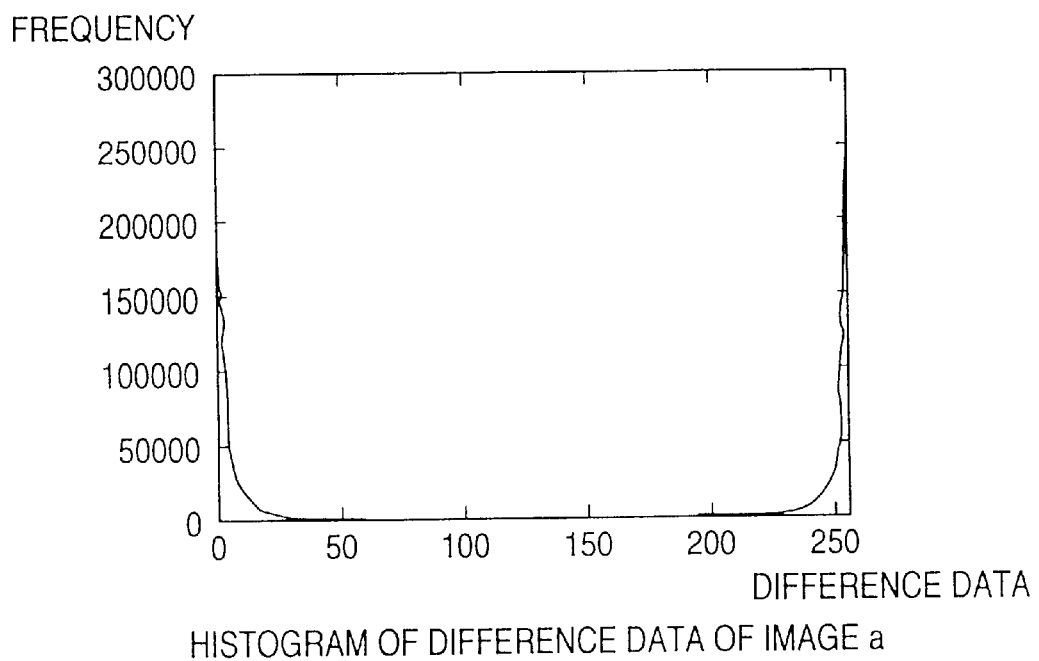
Figure 24A:
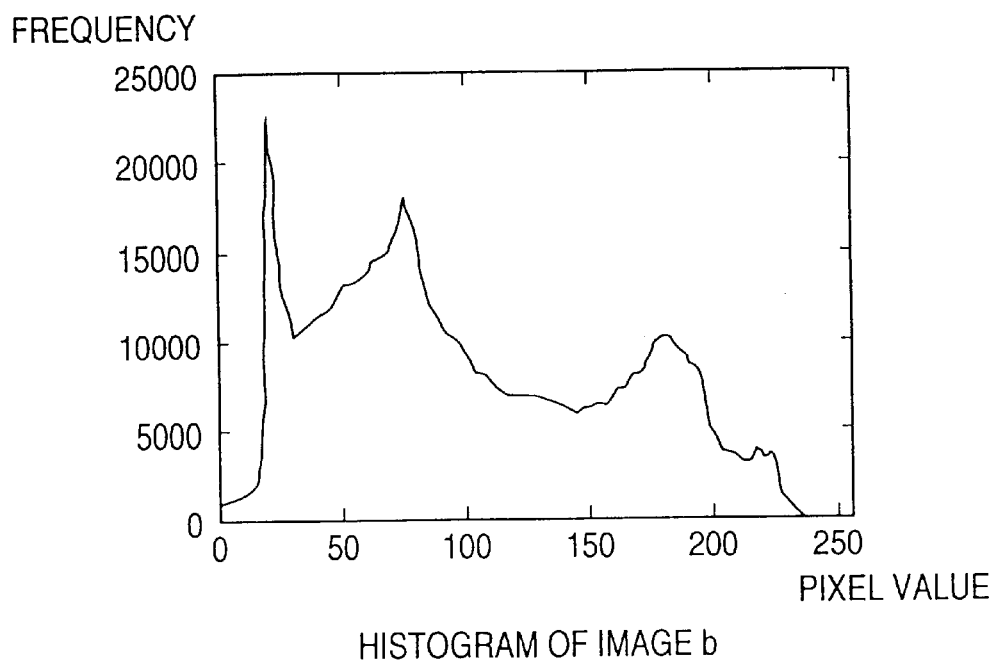
FIG. 24A is a graph showing a frequency distribution of the pixel values of image b.
Figure 24B:
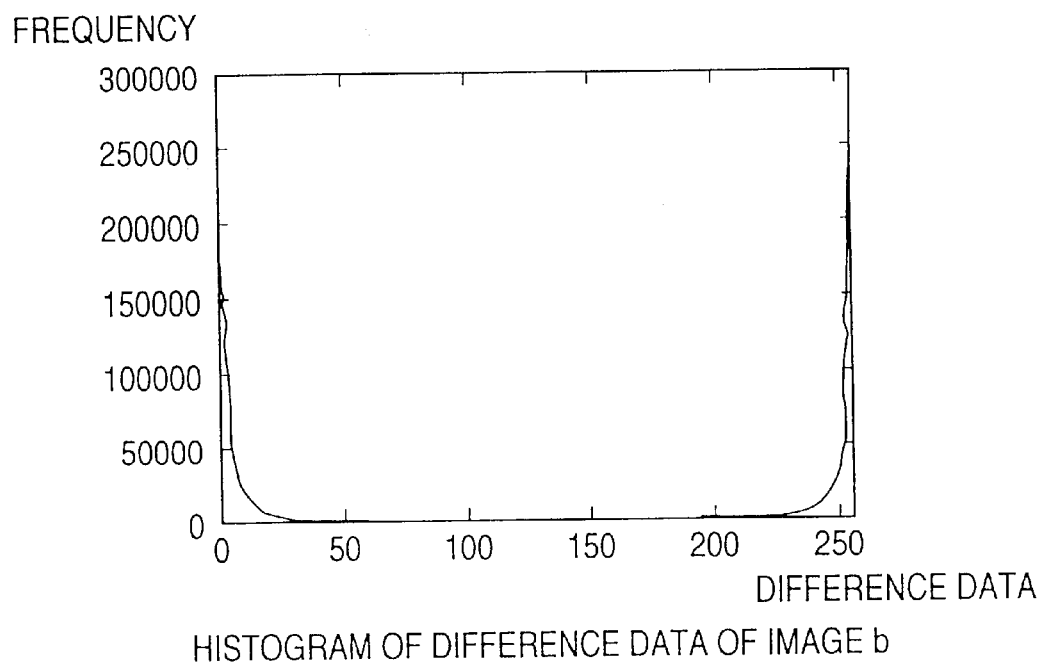
FIG. 24B is a graph showing a frequency distribution of difference data of image b.

Difference data having the above expression is concentrated in regions close to 0 and $2^N-1$. Specifically, FIG. 23A shows a frequency distribution of the pixel values of a certain one-frame image. If the difference calculation section 71 calculates difference data for this image, the difference data should have a frequency distribution shown in FIG. 23B. FIG. 24A shows a frequency distribution of the pixel values of another one-frame image. If the difference calculation section 71 calculates difference data for this image, the difference data should have a frequency distribution shown in FIG. 24B. It is noted that 8 bits are assigned to the pixel values of FIGS. 23A and 23B, and FIGS. 24A and 24B.

In general, the pixel values of adjacent pixels are close to each other and hence have a small difference. As a result, difference data having the expression described above with reference to FIGS. 20A and 20B is concentrated in regions close to 0 and 255 ($=2^8-1$).

Therefore, a large amount of additional information is embedded while increase in data amount due to the difference calculation by the difference calculation section 71 is prevented. That is, where the embedded encoder 3 embeds additional information into difference data, the number of difference data having the highest frequency that are made change subject pixel values is much larger than in the case where additional information is embedded into pixel values themselves. In each of the embodiment of FIGS. 23B and 24B, the highest frequency in the frequency distribution of the difference data is close to 10 times the highest frequency of the frequency distribution of the pixel values. The embedded encoder 3 can embed a large amount of additional information into an enormous number of difference data.

Figure 21:
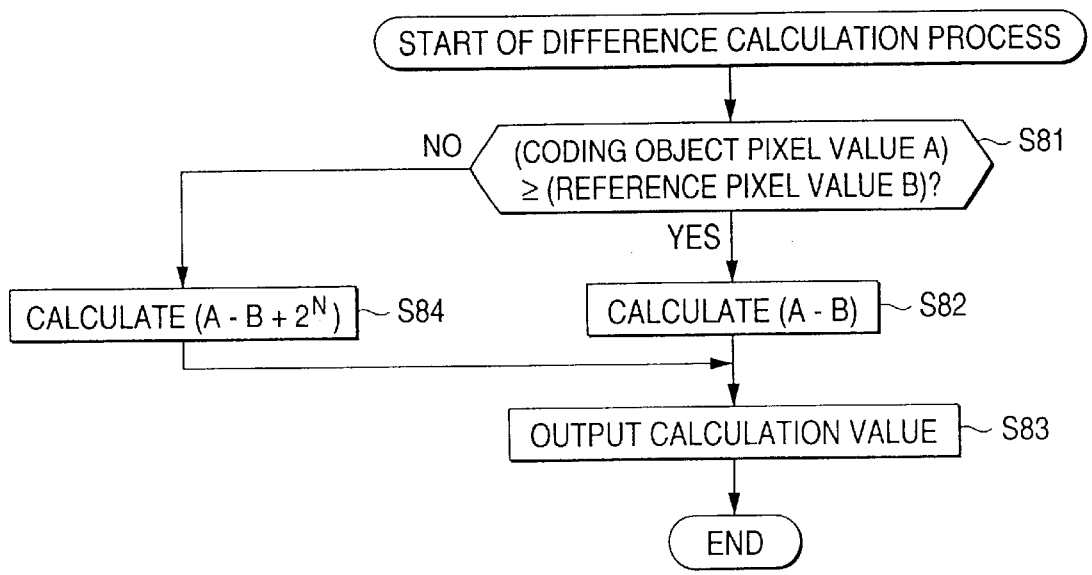
FIG. 21 is a flowchart showing a difference calculation process that in executed by a difference calculation section 71 shown in FIG. 16.
Figure 22:
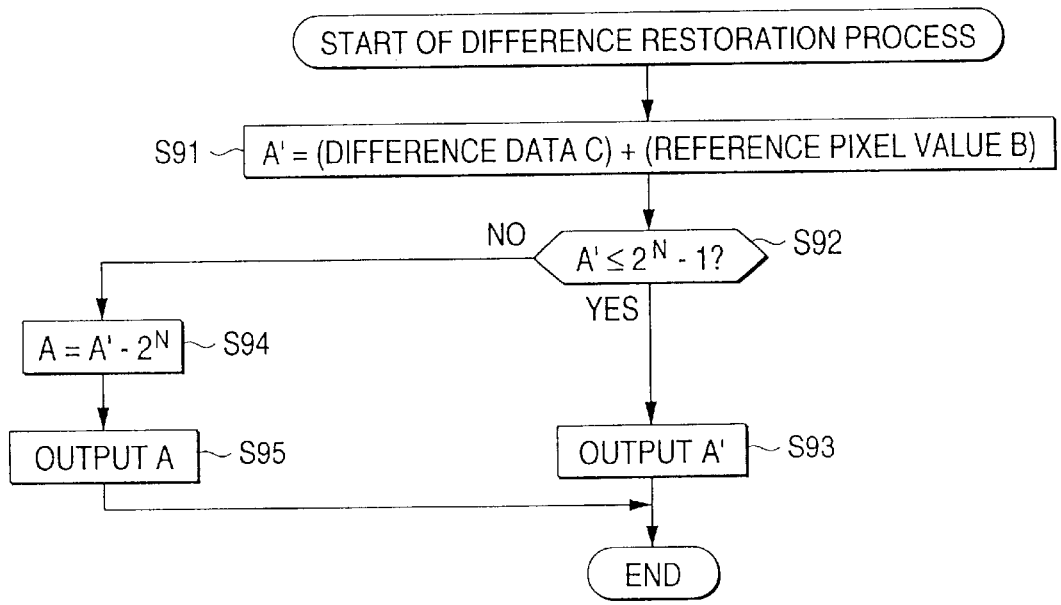
FIG. 22 is a flowchart showing a difference restoration process that is executed by a difference restoration section 81 shown in FIG. 18.

In calculating difference data in the difference calculation process of FIG. 21 and in restoring difference data to the original pixel values in the difference restoration process of FIG. 22, the process is branched in accordance with a magnitude relationship between pixel values, for example. The judgment of a magnitude relationship and the branching step take more processing time than an arithmetic operation and a logic operation. Therefore, it is desirable that difference data having the above expression be calculated without such a judgment or branching step.

Figure 25:
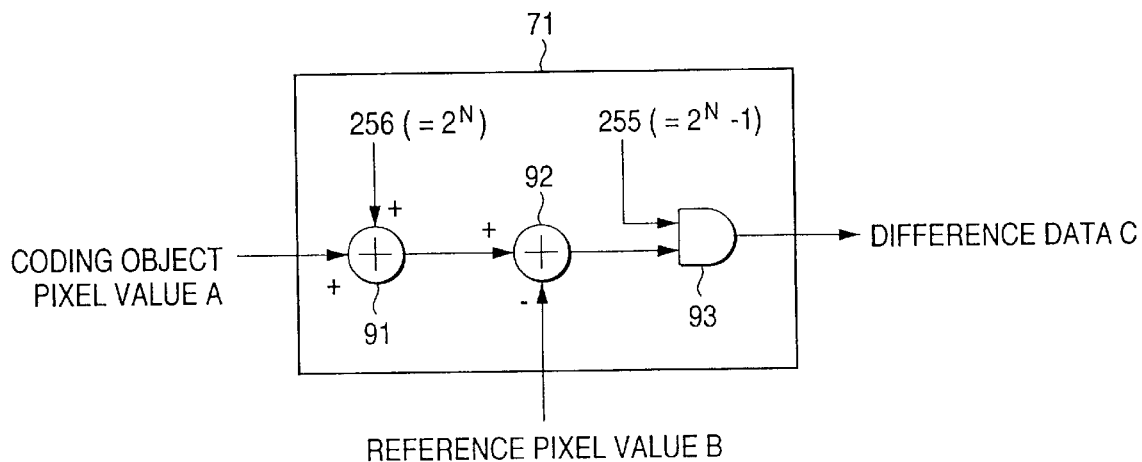
FIG. 25 shows an example configuration of the difference calculation section 71 shown in FIG. 16.

FIG. 25 shows an example configuration of the difference calculation section 71 shown in FIG. 16 for calculating difference data having the above expression without any judgment or branching step. It is assumed that 8 bits, for example, are assigned to the pixels constituting a coding object image.

The coding object pixel for which difference data is to be calculated among the pixels constituting the coding object image that is stored in the frame memory 31 is supplied to an arithmetic element 91. The pixel that is used as a reference pixel for calculating difference data (in this embodiment, the pixel immediately on the left of the coding object pixel) is supplied to an arithmetic element 92.

The arithmetic element 91 is supplied with not only the above-mentioned coding object pixel but also the maximum number of the numbers that are expressed by N bits that are assigned to the coding object pixel plus 1 (i.e., $2^N$; hereinafter referred to as a bit maximum value). In this embodiment, since the number N of bits of the coding object pixel is 8, $(2^8-1)+1=256$ is supplied to the arithmetic element 91. The arithmetic element 91 adds together the coding object pixel value A and the bit maximum value and outputs a resulting addition value to the arithmetic element 92.

The arithmetic element 92 subtracts the reference pixel value from the output of the arithmetic element 91 and supplies a resulting subtraction value to one input terminal of an AND gate 93.

The bit maximum value minus 1 (i.e., the maximum value of the numbers that are expressed by N bits, $2^N-1$) is supplied to the other input terminal of the AND gate 93 as a mask value for masking the bits excluding the lower N bits of the output of the arithmetic element 92. The AND gate 93 ANDs the output of the arithmetic element 92 and the mask value on a bit-by-bit basis, and thereby extracts the lower N bits of the output of the arithmetic element 92 and outputs the lower N bits as difference data for the coding object pixel. In this embodiment, since the number N of bits of the coding object pixel is 8, 255 is supplied to the AND gate 93 as the mask value. Therefore, the AND gate 93 outputs the lower 8 bits of the output of the arithmetic element 92 as difference data.

Next, a difference calculation process that is executed in the difference calculation section 71 of FIG. 25 to calculate difference data for a coding object pixel will be described with reference to a flowchart of FIG. 26.

In the difference calculation section 71, first, at step S101, the arithmetic element 91 adds together the coding object pixel value and the bit maximum value 256 ($=2^8$) and outputs a resulting addition value to the arithmetic element 92. The process then goes to step S102, where the arithmetic element 92 subtracts the reference pixel value from the addition value that is supplied from the arithmetic element 91 and outputs a resulting subtraction value to the AND gate 93. At step S103, the AND gate 93 masks the subtraction value that is supplied from the arithmetic element 92 with the mask value 255 (i.e., ANDs the subtraction value and the mask value on a bit-by-bit basis) and thereby extracts the lower N bits of the subtraction value that is output from the arithmetic element 92. The lower N bits are output as difference data for the coding object pixel and written to the frame memory 31. And the difference calculation process is finished.

Figure 26:
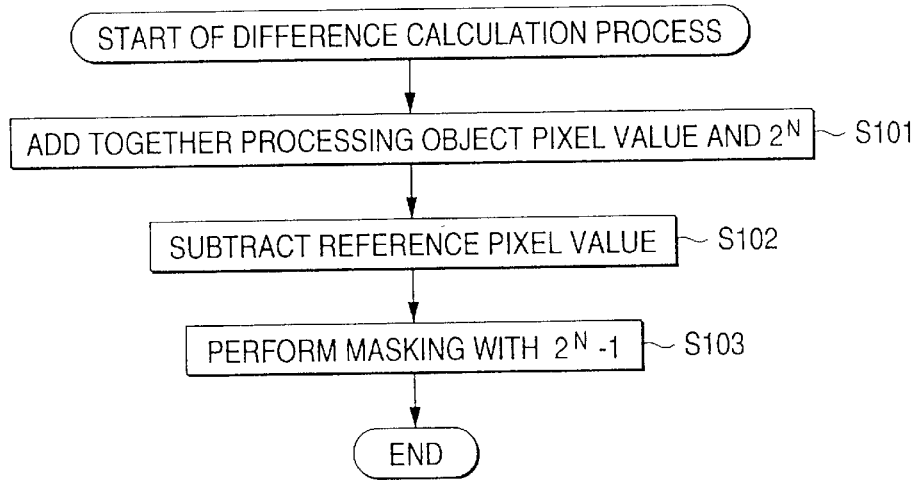
FIG. 26 in a flowchart showing a difference calculation process that is executed by the difference calculation section 71 of FIG. 25.

In the difference calculation process of FIG. 26, all of the coding object pixels stored in the frame memory 31 are processed sequentially.

In the above difference calculation process, N-bit difference data "diff" is calculated according to the equation diff=($2^N$+data−ref) & ($2^N-1$), where "data," "ref," and "diff" represent the coding object pixel value, the reference pixel value, and the difference data, respectively, and symbol "&" means bit-by-bit ANDing. Therefore, the difference calculation section 71 can calculate difference data "diff" without any judgment or branching step. That is, the difference calculation section 71 can calculate difference data at high speed without increasing the number of bits.

Figure 27:
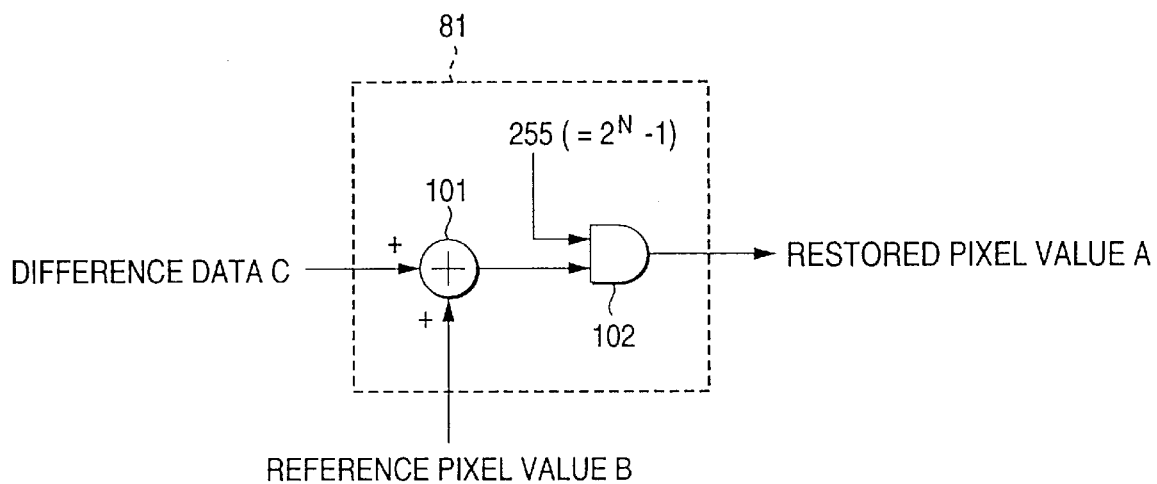
FIG. 27 shows an example configuration of the difference calculation section 81 shown in FIG. 18.

FIG. 27 shows an example configuration of the difference restoration section 81 shown in FIG. 18 for restoring difference data having the above-described expression to the original pixel value without any judgment or branching step.

Difference data stored in the frame memory 54 and the already restored pixel value that was used as a reference pixel value in calculating the difference data are supplied to an arithmetic element 101. Alternatively, the reference pixel value may be key data that was not be made difference data in the coding. The arithmetic element 101 adds together the difference data and the reference pixel value and supplies a resulting addition value to one input terminal of an AND gate 102.

The bit maximum value minus 1 (i.e., the maximum value of the numbers that are expressed by N bits, $2^N-1$) is supplied to the other input terminal of the AND gate 102 as a mask value for masking the bits excluding the lower N bits of the output of the arithmetic element 101. The AND gate 102 ANDs the output of the arithmetic element 101 and the mask value on a bit-by-bit basis, and thereby extracts the lower N bits of the output of the arithmetic element 101 and outputs the lower N bits as a restored pixel value of the difference data. In this embodiment, since as mentioned above the bit maximum value is 256 ($=2^8$), 255 is supplied to the AND gate 102 as the mask value. As a result, the AND gate 102 outputs the lower 8 bits of the output of the arithmetic element 101 as a restored pixel value.

Next, a difference restoration process that is executed in the difference restoration section 81 of FIG. 27 to restore difference data to the original pixel value will be described with reference to a flowchart of FIG. 28.

In the difference restoration section 81, first, at step S111, the arithmetic element 101 adds together the difference data and the reference pixel value and supplies a resulting addition value to the AND gate 102. At step S112, the AND gate 102 masks the addition value that is supplied from the arithmetic element 101 with the mask value (i.e., ANDs the addition value and the mask value on a bit-by-bit basis) and thereby extracts the lower N bits of the addition value that is output from the arithmetic element 110. The lower N bits are output as a restored pixel value, that is, the restored original pixel value of the difference data, and are written to the frame memory 54. And the difference restoration process is finished.

Figure 28:
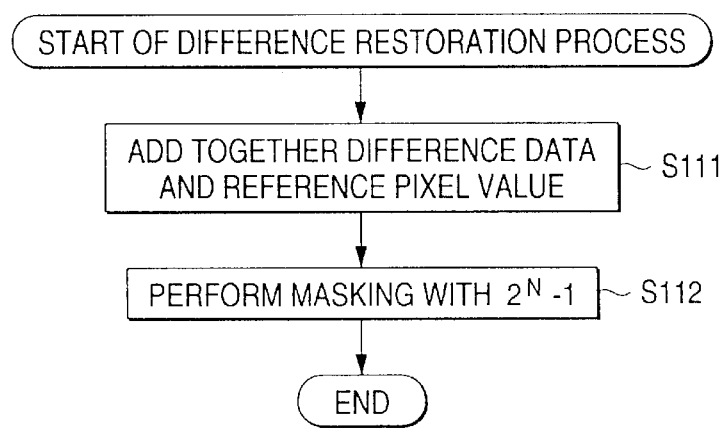
FIG. 28 is a flowchart showing a difference restoration process that is executed by the difference restoration section 81 of FIG. 27.

All of the difference data stored in the frame memory 54 are sequentially subjected to the difference restoration process of FIG. 28.

In the above difference restoration process, the N-bit original pixel value "data" is restored according to the equation data=(diff+ref) & ($2^N-1$), where "data," "ref," and "diff" represent the original pixel value, the reference pixel value, and the difference data, respectively. Therefore, the difference restoration section 81 can restore the difference data "diff" in which no increase in the number of bits occurred to the original pixel value "data" at high speed without any judgment or branching step.

Figure 29A:
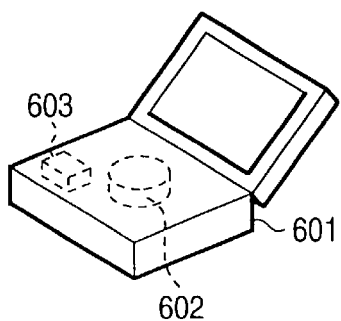
FIG. 29A shows a computer in which a program for causing execution of a process relating to the invention is to be installed.
Figure 29B:
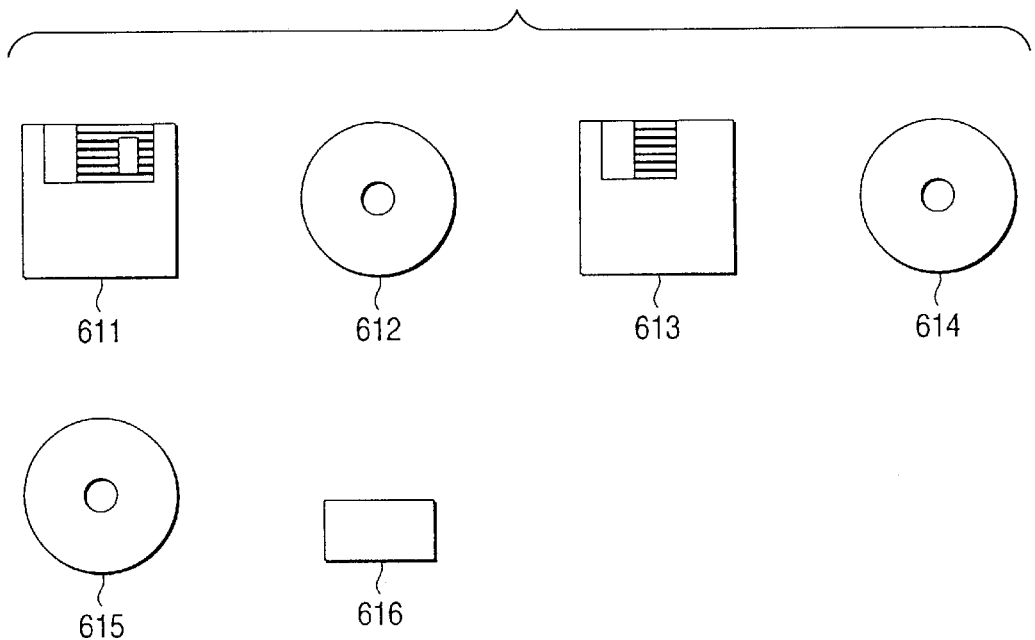
FIG. 29B shown example recording media on which a program for causing execution of a process relating to the invention is to be recorded.
Figure 29C:
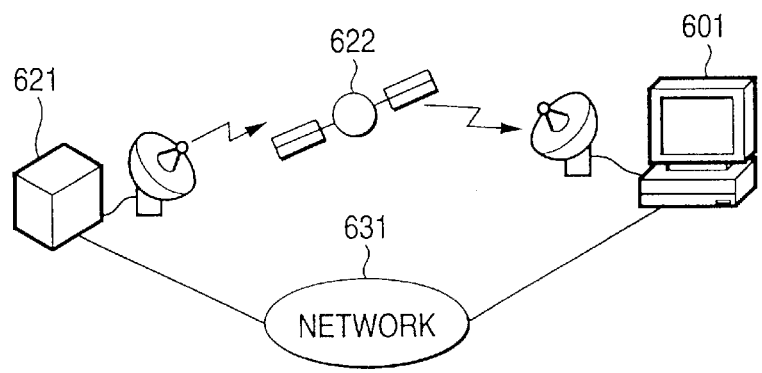
FIG. 29C is a conceptual diagram showing how a program for causing execution of a process relating to the invention in distributed to a computer via a satellite or a network.

Referring to FIGS. 29A to 29C, a description will be made of a recording medium on which a computer program is recorded and a signal that is supplied to a computer via a transmission medium that are used to establish a state that a program for execution of the above series of operations is installed in a computer and rendered executable by the computer.

As shown in FIG. 29A, a program is recorded in advance on a hard disk 602 or a semiconductor memory 603 as a recording medium that is incorporated in a computer 601.

Alternatively, as shown in FIG. 29B, a program is recorded temporarily or permanently on a recording medium such as a floppy disk 611, a CD-ROM (compact disc read-only memory) 612, an MO (magneto-optical) disc 613, a DVD (digital versatile disc) 614, a magnetic disk 615, or a semiconductor memory 616.

In addition to a method that a program is installed in a computer from any of the above recording media, as shown in FIG. 29C, it is possible to transfer a program wirelessly from a download site 621 to the computer 601 via an artificial satellite 622 for digital satellite broadcast or transfer a program by wire from the download site 621 to the computer 601 via a network 631 such as a LAN (local area network) or the Internet, and install it in the computer 601 so that it is stored in, for example, the hard disk 102 incorporated in the computer 601.

The steps described by a program for execution of each of various processes of the invention need not always be executed in a time-series manner in order as described in a flowchart, and the invention includes a process in which the steps are executed in parallel or individually (e.g., a parallel process and an object process).

FIG. 30 shows an example configuration of the computer 601 shown in FIGS. 29A and 29C.

As shown in FIG. 30, the computer 601 incorporates a CPU (central processing unit) 642. An input/output interface 645 is connected to the CPU 642 via a bus 641. When receiving, via the input/output interface 645, a command that has been produced by the user's manipulating an input section 647 such as a keyboard or a mouse, the CPU 642 executes a program that is stored in a ROM (read-only memory) 643 corresponding to the semiconductor memory 603 shown in FIG. 29A in accordance with the command. The flowchart shown in FIGS. 8, 13, 17, 19, 21, 22, 26, or 28 is executed as this program. Alternatively, the CPU 642 loads, into a RAM (random access memory) 644, a program that is stored in the hard disk 602, a program transferred via the satellite 622 or the network 631, received by a communication section 648, and installed in the hard disk 602, or a program read out from the floppy disk 611, the CD-ROM 612, the MO disc 613, the DVD 614, the magnetic disk 615, or the semiconductor memory 616 that is mounted in a drive 649 and installed in the hard disk 602, and executes the program. For example, the CPU 642 outputs a processing result to a display section 646 such as an LCD (liquid crystal display) via the input/output interface 645, when necessary.

Although in the embodiments the embedded coding operation and the decoding operation are performed by the CPUs 32 and 52 by causing them to execute computer programs, respectively, those operations can be performed by hardware dedicated thereto.

Although in the second embodiment the difference calculation section 71 calculates difference data of a certain pixel by using the pixel located immediately on the left of the object pixel as a reference pixel, the reference pixel may be another pixel, for example, the pixel of the preceding frame at the same position or the pixel of the preceding frame located at the same position after motion compensation.

Where the difference calculation section 71 uses, as a reference pixel, the pixel located immediately on the left of the pixel for which difference data is to be calculated, difference data of the leftmost pixel can be calculated by, for example, assuming that a pixel having a pixel value "0" exists on the left of the leftmost pixel.

What is claimed is:

1. A coding apparatus for coding first data according to second data, comprising:
   frequency distribution calculating means for calculating a frequency distribution of at least partial data of the first data;
   determining means for determining change subject data and change data from among the at least partial data of the first data based on the frequency distribution; and
   coding means for embedding the second data into the first data by changing from the change subject data to the change data according to the second data and outputting coded data, a frequency distribution of at least partial data of the coded data varying discontinuously in the vicinity of said change subject data and said change data.

2. The coding apparatus according to claim 1, further comprising input means for allowing input of the first data and the second data.

3. The coding apparatus according to claim 1, wherein the determining means determines, as the change subject data, data having a maximum frequency in the frequency distribution of the at least partial data of the first data.

4. The coding apparatus according to claim 1, wherein the determining means determines, as the change data, data having a frequency of 0 in the frequency distribution of the at least partial data of the first data.

5. The coding apparatus according to claim 1, wherein the determining means determines a plurality of change data.

6. The coding apparatus according to claim 1, wherein the first data is image data that consists of a plurality of pixel data.

7. A coding method for coding first data according to second data, comprising the steps of:
   calculating a frequency distribution of at least partial data of the first data;
   determining change subject data and change data from among the at least partial data of the first data based on the frequency distribution; and
   embedding the second data into the first data by changing from the change subject data to the change data according to the second data and outputting coded data, a frequency distribution of at least partial data of the coded data varying discontinuously in the vicinity of said change subject data and said change data.

8. The coding method according to claim 7, further comprising the step of allowing input of the first data and the second data.

9. The coding method according to claim 7, wherein the determining step determines, as the change subject data, data having a maximum frequency in the frequency distribution of the at least partial data of the first data.

10. The coding method according to claim 7, wherein the determining step determines, as the change data, data having a frequency of 0 in the frequency distribution of the at least partial data of the first data.

11. The coding method according to claim 7, wherein the determining step determines a plurality of change data.

12. The coding method according to claim 7, wherein the first data is image data that consists of a plurality of pixel data.

13. A decoding apparatus for decoding coded data that has been produced by coding first data according to second data, comprising:

frequency distribution calculating means for calculating a frequency distribution of at least partial data of the coded data;

determining means for determining change subject data and change data from among the at least partial data of the coded data based on a discontinuity of the frequency distribution; and decoding means for decoding the coded data into the original first data and decoding the second data that is embedded in the coded data by changing from the change data to the change subject data.

14. The decoding apparatus according to claim 13, wherein the determining means determines a plurality of change data.

15. The decoding apparatus according to claim 13, wherein the first data is image data consisting of a plurality of pixel data.

16. A decoding method for decoding coded data that has been produced by coding first data according to second data, comprising the steps of:

calculating a frequency distribution of at least partial data of the coded data;

determining change subject data and change data from among the at least partial data of the coded data based on a discontinuity of the frequency distribution; and decoding the coded data into the original first data and restoring the second data that is embedded in the coded data by changing from the change data to the change subject data.

17. The decoding method according to claim 16, wherein the determining step determines a plurality of change data.

18. The decoding method according to claim 16, wherein the first data is image data consisting of a plurality of pixel data.

19. A data processing system for coding first data into coded data according to second data and decoding the coded data, comprising:

first frequency distribution calculating means for calculating a first frequency distribution of at least partial data of the first data;

first determining means for determining change subject data and change data from among the at least partial data of the first data based on the first frequency distribution;

coding means for embedding the second data into the first data by changing from the change subject data to the change data according to the second data and outputting coded data, a frequency distribution of at least partial data of the coded data varying discontinuously in the vicinity of said change subject data and said change data;

second frequency distribution calculating means for calculating a second frequency distribution of at least partial data of the coded data;

second determining means for determining change subject data and change data from among the at least partial data of the coded data based on a discontinuity of the second frequency distribution calculated by the second frequency distribution calculating means; and decoding means for decoding the coded data into the original first data and restoring the second data that is embedded in the coded data by changing from the change data to the change subject data.

20. A storage medium storing a program that is capable of controlling a computer and serves to code first data according to second data, the program comprising the steps of:

calculating a frequency distribution of at least partial data of the first data;

determining change subject data and change data from among the at least partial data of the first data based on the frequency distribution; and embedding the second data into the first data by changing from the change subject data to the change data according to the second data and outputting coded data, a frequency distribution of at least partial data of the coded data varying discontinuously in the vicinity of said change subject data and said change data.

21. The storage medium according to claim 20, wherein the program further comprises the step of allowing input of the first data and the second data.

22. The storage medium according to claim 20, wherein the determining step determines, as the change subject data, data having a maximum frequency in the frequency distribution of the at least partial data of the first data.

23. The storage medium according to claim 20, wherein the determining step determines, as the change data, data having a frequency of 0 in the frequency distribution of the at least partial data of the first data.

24. The storage medium according to claim 20, wherein the determining step determines a plurality of change data.

25. The storage medium according to claim 20, wherein the first data is image data that consists of a plurality of pixel data.

26. A storage medium storing a program that is capable of controlling a computer and serves to decode coded data that has been produced by coding first data according to second data, the program comprising the steps of:

calculating a frequency distribution of at least partial data of the coded data;

determining change subject data and change data from among the at least partial data of the coded data based on a discontinuity of the frequency distribution; and decoding the coded data into the original first data and restoring the second data that is embedded in the coded data by changing from the change data to the change subject data.

27. The storage medium according to claim 26, wherein the determining step determined plurality of change data.

28. The storage medium according to claim 26, wherein the first data is image data consisting of a plurality of pixel data.

29. An information signal by which a computer program is transmitted, the program serving to code first data according to second data and comprising the steps of:

calculating a frequency distribution of at least partial data of the first data;

determining change subject data and change data from among the at least partial data of the first data based on the frequency distribution; and embedding the second data into the first data by changing from the change subject data to the change data according to the second data and outputting coded data, a frequency distribution of at least partial data of the coded data varying discontinuously in the vicinity of said change subject data and said change data.

30. The signal according to claim 29, wherein the program further comprises the step of allowing input of the first data and the second data.

31. The signal according to claim 29, wherein the determining step determines, as the change subject data, data having a maximum frequency in the frequency distribution of the at least partial data of the first data.

32. The signal according to claim 29, wherein the determining step determines, as the change data, data having a frequency of 0 in the frequency distribution of the at least partial data of the first data.

33. The signal according to claim 29, wherein the determining step determines a plurality of change data.

34. The signal according to claim 29, wherein the first data is image data that consists of a plurality of pixel data.

35. An information signal by which a computer program is transmitted, the program serving to decode coded data that has been produced by coding first data according to second data, the program comprising the steps of:

calculating a frequency distribution of at least partial data of the coded data;

determining change subject data and change data from among the at least partial data of the coded data based on a discontinuity of the frequency distribution; and decoding the coded data into the original first data and restoring the second data that is embedded in the coded data by changing from the change data to the change subject data.

36. The signal according to claim 35, wherein the determining step determines a plurality of change data.

37. The signal according to claim 35, wherein the first data is image data consisting of a plurality of pixel data.

38. An information signal by which first data is transmitted, the first data having been coded according to second data by using a program capable of controlling a computer, the program comprising:

calculating a frequency distribution of at least partial data of the first data;

determining change subject data and change data from among the at least partial data of the first data based on the frequency distribution; and embedding the second data into the first data by changing from the change subject data to the change data according to the second data and outputting coded data, a frequency distribution of at least partial data of the coded data varying discontinuously in the vicinity of said change subject data and said change data.

39. The signal according to claim 38, wherein the program further comprises the step of allowing input of the first data and the second data.

40. The signal according to claim 38, wherein the determining step determines, as the change subject data, data having a maximum frequency in the frequency distribution of the at least partial data of the first data.

41. The signal according to claim 38, wherein the determining step determines, as the change data, data having a frequency of 0 in the frequency distribution of the at least partial data of the first data.

42. The signal according to claim 38, wherein the determining step determines a plurality of change data.

43. The signal according to claim 38, wherein the first data is image data that consists of a plurality of pixel data.

* * * * *